(12) United States Patent
Kawamura et al.

(10) Patent No.: US 6,969,250 B1
(45) Date of Patent: Nov. 29, 2005

(54) EXHAUST GAS TREATING DEVICE

(75) Inventors: Kotaro Kawamura, Tokyo (JP);
Rikiya Nakamura, Tokyo (JP); Yuji
Shirao, Tokyo (JP); Yoshiro
Takemura, Kanagawa (JP); Kazutaka
Okuda, Tokyo (JP); Takeshi Tsuji,
Tokyo (JP)

(73) Assignee: Ebara Corporation, Tokyo (JP)

( * ) Notice: Subject to any disclaimer, the term of this patent is extended or adjusted under 35 U.S.C. 154(b) by 0 days.

(21) Appl. No.: 09/857,025

(22) PCT Filed: Nov. 29, 1999

(86) PCT No.: PCT/JP99/06632

§ 371 (c)(1),
(2), (4) Date: May 31, 2001

(87) PCT Pub. No.: WO00/32990

PCT Pub. Date: Jun. 8, 2000

(30) Foreign Application Priority Data

| Dec. 1, 1998 | (JP) | 10/342243 |
| Sep. 9, 1999 | (JP) | 11/255855 |
| Nov. 5, 1999 | (JP) | 11/315271 |

(51) Int. Cl.$^7$ .............. F23J 15/00; F23G 7/06
(52) U.S. Cl. .............. 431/185; 431/182; 431/122; 110/213; 110/214
(58) Field of Search .............. 431/5, 202, 170, 431/181, 182, 185, 188, 121, 32, 7, 122; 110/203, 212, 214, 215, 341, 346, 213; 165/DIG. 76, 165/DIG. 11; 15/104.068, 105.068; 239/132.3

(56) References Cited

U.S. PATENT DOCUMENTS

| 2,326,525 | A | * | 8/1943 | Diwoky ................. 208/48 R |
| 3,100,734 | A | * | 8/1963 | Rex, Jr. et al. ............. 110/317 |
| 3,567,399 | A | * | 3/1971 | Altmann et al. ............. 431/5 |
| 3,819,468 | A | | 6/1974 | Sauder et al. ............. 428/99 |
| 3,840,344 | A | * | 10/1974 | Garbo ..................... 431/7 |
| 3,873,671 | A | * | 3/1975 | Reed et al. ................ 431/5 |
| 3,885,919 | A | * | 5/1975 | Pillard ..................... 431/202 |

(Continued)

FOREIGN PATENT DOCUMENTS

EP         0160 524 A    * 11/1985

(Continued)

OTHER PUBLICATIONS

Copending U.S. Appl. No. 09/509,995, filed Apr. 5, 2000, entitled "Combustor for Waste Gas Treatment".

(Continued)

Primary Examiner—Josiah C. Cocks
(74) Attorney, Agent, or Firm—Wenderoth, Lind & Ponack, L.L.P.

(57) ABSTRACT

A waste gas treatment system having a burner part and a combustion chamber provided at a downstream side of the burner part. Combustion flames are formed from the burner part toward the combustion chamber, and a waste gas is introduced into the combustion flames, thereby oxidatively decomposing the waste gas. The combustion chamber is formed from an inner wall made of a fiber-reinforced ceramic material. Therefore, the wear of the inner wall due to heat and corrosion is minimized, and thermal stress cracking is also reduced. Consequently, the lifetime of the system increases, and the cost of equipment and the availability factor can be improved. In addition, because the inner wall exhibits no catalytic effect, the formation of thermal NOx is suppressed, and it is possible to achieve environmental preservation and to simplify the treatment equipment.

17 Claims, 19 Drawing Sheets

U.S. PATENT DOCUMENTS

| | | | |
|---|---|---|---|
| 4,444,724 A | | 4/1984 | Goetschius .................. 422/173 |
| 4,547,148 A | * | 10/1985 | Holmer ...................... 431/328 |
| 4,801,437 A | | 1/1989 | Konagaya et al. |
| 4,857,075 A | * | 8/1989 | Lipp ........................ 239/132.3 |
| 5,165,887 A | * | 11/1992 | Ahmady ..................... 431/329 |
| 5,462,429 A | | 10/1995 | Pritchard et al. .............. 431/5 |
| 5,510,093 A | | 4/1996 | Bartz et al. |
| 5,603,905 A | * | 2/1997 | Bartz et al. .................... 431/7 |
| 5,643,544 A | * | 7/1997 | Henkelmann ............ 423/245.3 |
| 5,938,422 A | * | 8/1999 | Smith et al. ................... 431/5 |
| 6,234,787 B1 | * | 5/2001 | Endoh et al. .................. 431/5 |

FOREIGN PATENT DOCUMENTS

| | | | |
|---|---|---|---|
| JP | 48-36012 | | 5/1973 |
| JP | 50-10807 | | 2/1975 |
| JP | 61-42321 | | 2/1986 |
| JP | 1-134197 | | 5/1989 |
| JP | 2-68414 | | 3/1990 |
| JP | 7-138078 | | 5/1995 |
| JP | 7-305819 | | 11/1995 |
| JP | 8-16527 | | 2/1996 |
| JP | 8-105618 | | 4/1996 |
| JP | 10-38245 | | 2/1998 |
| JP | 10-54534 | | 2/1998 |
| JP | 10-61934 | | 3/1998 |
| JP | 10061934 A | * | 3/1998 |
| JP | 10-110926 | | 4/1998 |
| JP | 11-79871 | | 3/1999 |
| JP | 11-193916 | | 7/1999 |
| JP | 11-218317 | | 8/1999 |
| WO | WO-98/06977 A | * | 2/1998 |

OTHER PUBLICATIONS

Copending U.S. Patent Application based on PCT/JP99/06632, U.S. Appl. No. 09/857,024, filed May 31, 2001, entitled "Waste Gas Treatment System".

Copy of International Search Report of PCT/JP99/06631.

* cited by examiner

EXHAUST GAS TREATING DEVICE

TECHNICAL FIELD

The present invention relates to a waste gas treatment system for treating a waste gas likely to generate dust when it is treated by combustion. For example, the present invention relates to a combustion type waste gas treatment system for combustion-treating hazardous and combustible waste gases containing silane gas ($SiH_4$) or a halogen-containing gas ($NF_3$, $ClF_3$, $SF_6$, $CHF_3$, $C_2F_6$, $CF_4$, etc.) or hardly decomposable waste gases.

BACKGROUND ART

Waste gases that are likely to generate dust when treated by combustion include those which contain hazardous and combustible gases, e.g., silane ($SiH_4$) and disilane ($Si_2H_6$) discharged from semiconductor manufacturing systems or liquid crystal panel manufacturing systems. Further, waste gases containing scarcely decomposable, global warming gases (PFCs) are also likely to generate dust when treated by combustion. Such waste gases cannot be emitted into the atmosphere as they are because they would have adverse effects upon the human body and change the global environment. Therefore, the common practice is to introduce such waste gases into a pretreatment system where the waste gas is made harmless by oxidation through combustion. For this treatment, a method is widely employed in which flames are formed in a furnace by using an auxiliary burning gas and the waste gas is burned in the flames.

In such a combustion type waste gas treatment system, the auxiliary burning gas uses hydrogen, city (natural) gas, LPG or the like as a fuel gas, and oxygen or air is usually used as an oxidizing agent. The greater part of the running cost of the system is the cost for consumption of the fuel gas and the oxidizing agent. Accordingly, how much hazardous waste gas is decomposed at high efficiency with a minimum amount of auxiliary burning gas is a measure for evaluating the performance of this type of system.

A general arrangement of a combustor used in a conventional waste gas treatment system of the above-described combustion type is shown in FIGS. 27 and 28. The illustrated combustor has a burner part 101 and a combustion reaction part (combustion chamber) 102 for oxidatively decomposing waste gas under heating at a stage subsequent to the burner part 101. The burner part 101 has a waste gas nozzle 103 opened in the center of the ceiling of the combustion reaction part 102 to introduce a waste gas G1 to be treated into the combustion reaction part 102. The burner part 101 further has a plurality of auxiliary burning gas nozzles 104 opened in the outer periphery of the waste gas nozzle 103 to introduce an auxiliary burning gas G2 into the combustion reaction part 102. A combustion gas outlet 105 is integrally connected to the lower end of the combustion reaction part 102. Thus, the waste gas G1 is passed through the center of flames annularly formed by the auxiliary burning gas G2 blown off from the auxiliary burning gas nozzles 104. While passing through the center of the flames, the waste gas G1 is mixed with the flames and thus burned. Combustion gas resulting from the burning of the waste gas Gi is discharged to the outside from the combustion gas outlet 105.

In general, the combustion reaction part 102 is defined and formed by an inner wall surface 106a of a cylindrical furnace body 106 made of a metal, e.g., a stainless steel. According to need, a thermal insulator for heat insulation is installed on the outer peripheral surface of the furnace body 106. Alternatively, a water-cooling structure is employed.

Meanwhile, the mainstream method of decomposition-treating gases containing fluorocarbons, which are considered to be causes of global warming, is heat decomposition in a high-temperature environment or -decomposition in a plasma for the time being. To use these techniques, decomposition treatment of fluorocarbon-containing gases is carried out under application of an enormous amount of energy for heating and plasma generation in decomposition treatment equipment having a complicated control mechanism for controlling a heating device, e.g., a heater, a plasma generator, a safety device, etc.

However, in the conventional example as shown in FIGS. 27 and 28, the combustion reaction part 102 is formed by the metallic furnace body 106, and the furnace body 106 is exposed to a high-temperature atmosphere of 1300° C. or more when combustion flames are formed (during operation). Therefore, the furnace body 106 wears out rapidly and cannot withstand long-term operation. In particular, when a halogen-containing gas is decomposition-treated by this system, the furnace body is etched or corroded under high temperature by a halogen gas (HCl, HF, etc.) produced after the treatment reaction and hence wears out rapidly.

When the furnace body 106 wears out in a short period of time as stated above, it is necessary to replace the furnace body 106 frequently. This causes the cost of equipment to increase. Further, when the metallic furnace body wears out, there is a danger that wear may develop in the surrounding structures (the thermal insulator, the water-cooled vessel, etc.). Therefore, it is necessary to inspect the furnace body for the degree of wear by disassembling it frequently. This causes the availability for use of the equipment to be reduced markedly and gives rise to an increase in the running cost.

Further, because the inner wall surface of the metallic furnace body 106 is heated to a high temperature by combustion flames in the combustion reaction part 102, the formation of thermal NOx is undesirably promoted by the catalytic effect of the metal. For example, this type of waste gas combustion equipment in semiconductor industry facilities is generally designed on the assumption that it will be installed in a clean room. Therefore, the equipment needs to be made compact in size. However, if a large amount of NOx is produced, it becomes necessary to separately provide a special-purpose treatment mechanism for treating the NOx. Consequently, the equipment cannot be made compact in size.

Further, in a combustor that forms combustion flames as stated above, flames are formed at the lower end of the burner part 101, resulting in a rise in temperature in the vicinity of the opening portion of the burner part 101, which is made of a stainless steel or the like. Therefore, there is a danger that the auxiliary burning gas G2 supplied to the burner part 101 may ignite and explode.

Further, when gases such as $SiH_4$ used in semiconductor device manufacturing processes, particularly CVD processes or the like, are made harmless by a heat decomposition type waste gas treatment system, dust, e.g. $SiO_2$, is generated. Such dust flows, together with waste gas, and adheres to the inner wall surfaces of piping and so forth, causing the exhaust pressure loss to increase. As methods of preventing the adhesion of dust to the inner wall surfaces of piping and so forth, the following methods have heretofore been available: a method wherein dust is blown off with a cleaning gas; a method wherein dust is scraped off with an intermittent manual scraper; and a method wherein a cleaning gas is always supplied through a porous inner wall to prevent adhesion of dust.

With the blow-off method using a cleaning gas, a fixed nozzle is provided over the circumferential area of piping to blow off a cleaning gas constantly or intermittently to remove dust. This method involves the problem that if the position of the nozzle is away from where dust may adhere, the dust removal effect is lessened. If a large amount of cleaning gas is supplied to maintain the dust removal effect, the cost of cleaning gas increases. In addition, because a large amount of gas flows, it is necessary to increase the diameter of piping in order to minimize the pressure loss.

With the method using an intermittent manual scraper, scraping is performed after an amount of accumulated dust has grown large. Therefore, the method requires a tank for storing large lumps of scraped dust.

With the prevention of adhesion of dust by constantly supplying a cleaning gas through a porous inner wall, it is necessary to supply a large amount of cleaning gas in order to maintain the flow velocity of cleaning gas through the inner wall throughout the piping so as to prevent adhesion of dust. Accordingly, it is necessary to increase the diameter of the piping in order to minimize the pressure loss due to the flow of a large amount of gas.

Further, the cost of cleaning gas is increasing, and it is necessary to increase the size of equipment such as a duct for exhausting the gas discharged from the pretreatment system in a building to the outside of the building.

The present invention was made in view of the above-described circumstances, and an object of the present invention is to provide a waste gas treatment system designed so that the wear of an inner wall constituting a combustion reaction part exposed to a high temperature is minimized to increase the working life, reduce the cost of equipment and improve the work availability, and the formation of NOx can be suppressed.

Another object of the present invention is to provide a waste gas treatment system designed to suppress a rise in temperature due to flames in the vicinity of the opening of a combustion burner so as to be free from the danger of explosion of an auxiliary burning gas or the like.

A further object of the present invention is to provide a waste gas treatment system capable of reliably removing dust from the inner wall surface of piping and requiring a minimum amount of cleaning gas when it is injected.

SUMMARY OF THE INVENTION

The present invention provides a waste gas treatment system having a burner part and a combustion chamber provided at the downstream side of the burner part, wherein combustion flames are formed from the burner part toward the combustion chamber. A waste gas is introduced into the combustion flames, thereby oxidatively decomposing the waste gas. In the waste gas treatment system, the combustion chamber is formed from an inner wall made of a fiber-reinforced ceramic material. Therefore, the wear of the inner wall due to heat and corrosion is minimized, and thermal stress cracking is also reduced. Consequently, the lifetime of the system increases, and the cost of equipment and the availability factor can be improved. In addition, because the inner wall exhibits no catalytic effect, the formation of thermal NOx is suppressed, and it is possible to achieve environmental preservation and to simplify the treatment equipment. In addition, because the space between the inner wall and the outer vessel is maintained under a purge gas atmosphere of higher pressure than the pressure in the combustion chamber, it is possible to prevent hazardous gases in the combustion chamber from leaking to the outside.

In addition, there is provided a waste gas treatment system wherein a burner part has a cylindrical member which is closed at the top thereof and has an opening at the bottom thereof. The cylindrical member has a waste gas inlet in the top thereof and an air nozzle at a predetermined position on the side wall thereof. The cylindrical member further has an auxiliary burning gas nozzle in the side wall in the vicinity of the opening. A waste gas introduced from the waste gas inlet and air blown off from the air nozzle are mixed together, and an auxiliary burning gas blown off from the auxiliary burning gas nozzle is ignited to form combustion flames downward below the opening. In addition, a cooling means is provided to cool an auxiliary burning gas inlet part for introducing a fuel gas into the auxiliary burning gas nozzle. Accordingly, even when the auxiliary burning gas inlet part is heated by flames, the rise in temperature is suppressed below the ignition point of the auxiliary burning gas. Therefore, there is no danger that the auxiliary burning gas may explode.

In addition, there is provided a waste gas treatment system that is provided with a dust removing means for removing dust from the inner wall of the burner part and/or the inner wall of the combustion chamber or for preventing adhesion of dust thereto, thereby allowing the waste gas treatment system to be operated for a long period of time.

In addition, there is provided a dust remover for removing dust from the inner wall of piping through which a gas containing a large amount of dust flows. The dust remover includes a scraping mechanism placed in the piping. The scraping mechanism has rod-shaped scraping member secured to a main shaft to extend in the longitudinal direction of the piping. The dust remover further includes a support mechanism for supporting the main shaft of the scraping mechanism so that the scraping member moves in the inner peripheral direction in contact with the inner surface of the piping or with a slight gap therebetween, and a driving mechanism for continuously or periodically oscillating or rotating the scraping mechanism about the main shaft. Thus, a cleaning gas is supplied from the outside of the piping through the hollow portions of the main shaft and the scraping member and blown off from the distal end of the scraping member or from a multiplicity of holes or slits in the surface thereof. Consequently, it is possible to remove dust from an area in the piping that cannot be reached by the scraping member. In addition, it becomes possible to remove dust attached to the scraping mechanism itself.

In addition, there is provided a waste gas treatment system wherein a burner part has a cylindrical member which is closed at the top thereof and has an opening at the bottom thereof. The cylindrical member has a waste gas inlet in the top thereof and an air nozzle at a predetermined position on the side wall thereof. The cylindrical member further has an auxiliary burning gas nozzle in the side wall in the vicinity of the opening. The air nozzle is arranged to promote ignition of an auxiliary burning gas injected from the auxiliary burning gas nozzle and to blow a swirling air flow downward against combustion flames formed downward below the opening. Accordingly, it becomes unlikely that dust will adhere to the inner wall of the burner part.

In addition, there is provided a waste gas treatment system wherein a burner part has a cylindrical member which is closed at the top thereof and has an opening at the bottom thereof. The cylindrical member has a waste gas inlet in the top thereof and an air nozzle at a predetermined position on the side wall thereof. The cylindrical member further has an auxiliary burning gas nozzle in the side wall in the vicinity of the opening. The inner diameters of the waste gas inlet and the cylindrical member gradually increase toward the combustion chamber. Consequently, there is no angular portion such as a right-angled portion in the burner part, and it becomes unlikely that dust will adhere to the inner wall of the nozzle part.

In addition, there is provided a waste gas treatment system having a burner part, a combustion chamber provided at the downstream side of the burner part, and a combustion gas cooling section provided at the downstream side of the combustion chamber. The burner part, the combustion chamber and the combustion gas cooling section are provided integrally. The burner part is provided with a waste gas inlet for introducing a waste gas and an air nozzle for injecting air to generate a swirling flow. The combustion gas cooling section is provided with a liquid spray nozzle for spraying a liquid for cooling the waste gas flowing in from the combustion chamber and for capturing dust contained in the waste gas, an exhaust pipe for discharging the waste gas, and a drain pipe for draining the liquid sprayed from the liquid spray nozzle. With the waste gas treatment system thus arranged, the waste gas can be decomposition-treated, and dust, HCl and HF in the waste gas introduced from the waste gas inlet can be efficiently captured and absorbed in the liquid sprayed from the spray nozzle.

BEST MODE FOR CARRYING OUT THE INVENTION

Figure 1:
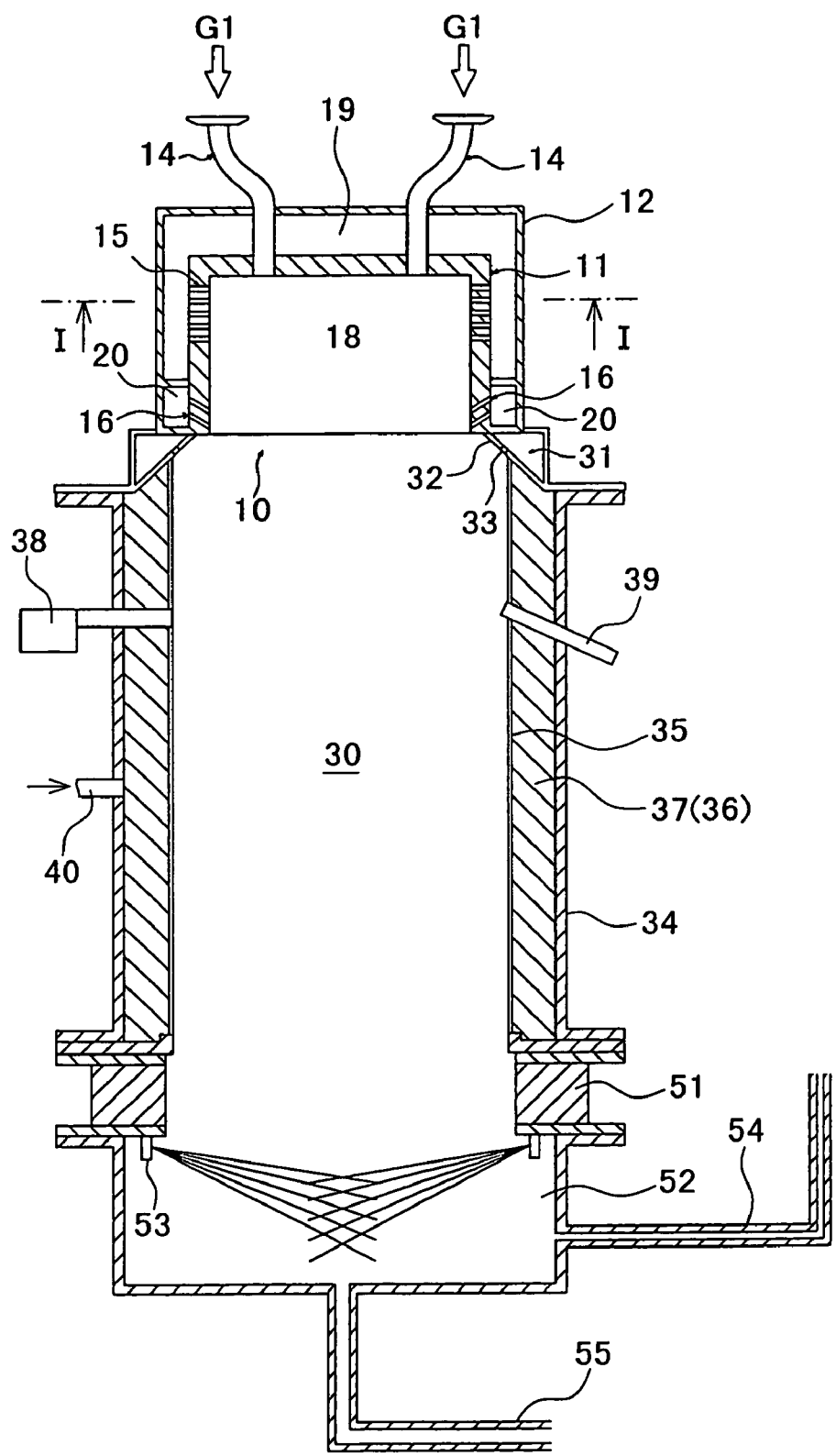
FIG. 1 is a diagram showing the arrangement of a waste gas combustor in the waste gas treatment system according to the present invention.
Figure 2:
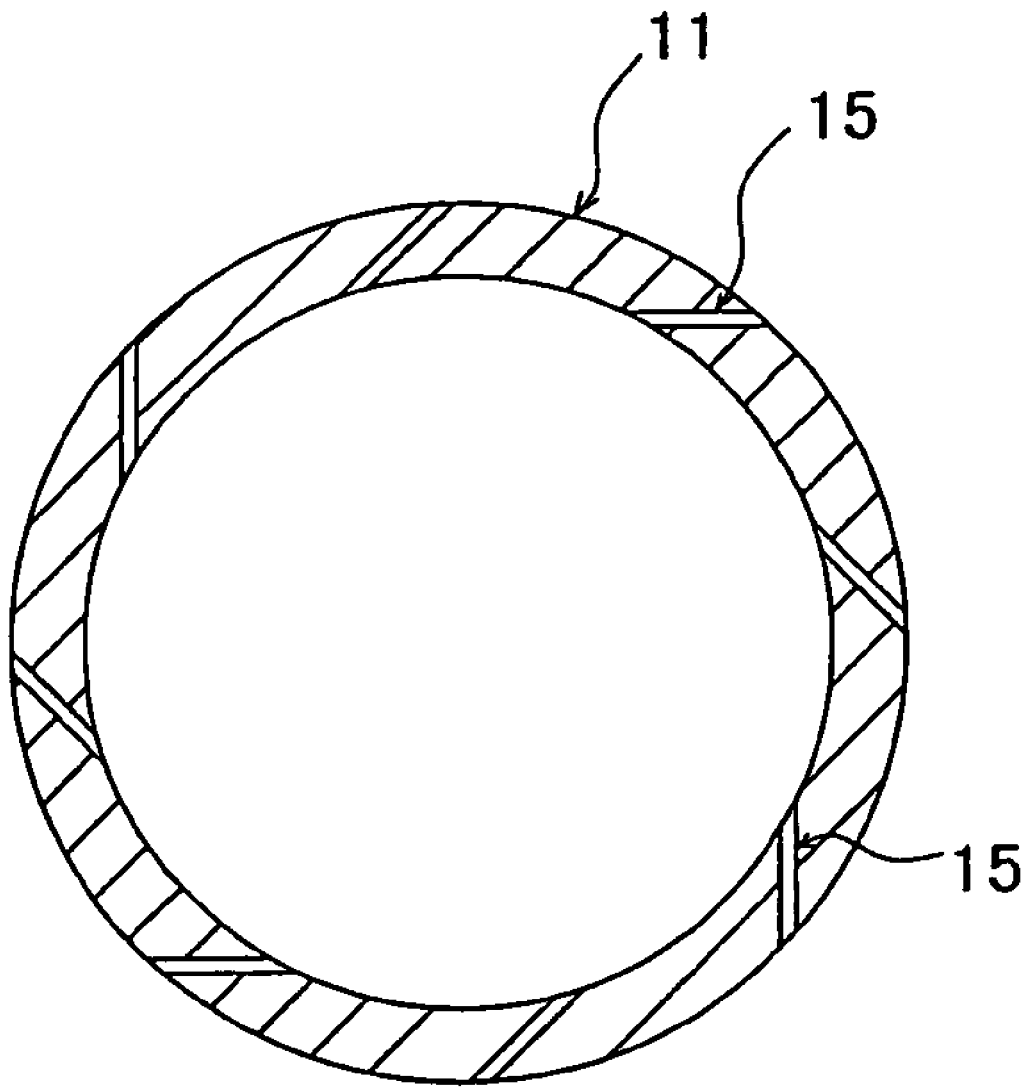
FIG. 2 is a sectional view taken along the line I—I in FIG. 1.

FIGS. 1 and 2 are diagrams showing the arrangement of a waste gas combustor in the waste gas treatment system according to the present invention. FIG. 1 is a vertical sectional view, and FIG. 2 is a sectional view taken along the line I—I in FIG. 1. The waste gas combustor is formed in the shape of a cylindrical closed vessel as a whole. The waste gas combustor has a burner part 10 in an upper stage and a combustion chamber (combustion reaction part) 30 in an intermediate stage. The waste gas combustor has a cooling part 51 and a discharge part 52 in a lower stage. As a cooling medium in the cooling part 51, for example, a liquid, e.g. water, or a gas, e.g., air, is used.

The burner part 10 has a cylindrical member 11 forming a flame stabilizing portion 18 opening toward the combustion chamber 30. The burner part 10 further has an outer cylinder 12 surrounding the cylindrical member 11 with a predetermined space therebetween. Between the cylindrical member 11 and the outer cylinder 12, an air chamber 19 for holding air for combustion is formed, together with an auxiliary burning gas chamber 20 for holding an auxiliary burning gas, e.g. a premixed gas of hydrogen and oxygen. The air chamber 19 and the auxiliary burning gas chamber 20 are communicated with an air source and a gas source (not shown), respectively. As the auxiliary burning gas, hydrogen, propane gas, city gas, etc. is used.

Waste gas inlet pipes 14 are connected to the top of the cylindrical member 11 covering the upper side of the flame stabilizing portion 18 to introduce into the flame stabilizing portion 18 a waste gas G1 containing silane ($SiH_4$) or the like discharged, for example, from a semiconductor manufacturing system.

The cylindrical member 11 is provided with a plurality of air nozzles 15 for providing communication between the air chamber 19 and the flame stabilizing portion 18 and a plurality of auxiliary burning gas nozzles 16 for providing communication between the auxiliary burning gas chamber 20 and the flame stabilizing portion 18. As shown in FIG. 2, the air nozzles 15 extend at a predetermined angle to the tangential direction to the cylindrical member 11 to blow off air so as to produce swirling flows in the flame stabilizing portion 18. Similarly, the auxiliary burning gas nozzles 16 extend at a predetermined angle to the tangential direction to the cylindrical member 11 to blow off an auxiliary burning gas so as to form swirling flows in the flame stabilizing portion 18. The air nozzles 15 and the auxiliary burning gas nozzles 16 are disposed equally in the circumferential direction of the cylindrical member 11.

A secondary air chamber 31 is formed around the boundary between the flame stabilizing portion 18 and the combustion chamber 30 so as to surround the opening of the flame stabilizing portion 18. The secondary air chamber communicates with an air source (not shown) for supplying secondary air. A partition plate 32 dividing the secondary air chamber 31 from the combustion chamber 30 is provided with secondary air nozzles 33 equally disposed in the circumferential direction to blow off secondary air into the combustion chamber 30 to oxidize waste gas.

The combustion chamber 30 is a space for oxidatively decomposing waste gas at a stage subsequent to the burner part 10. The combustion chamber 30 is defined by a cylindrical inner wall 35 provided inside a hermetic cylindrical outer vessel 34 made of a metal or the like. The inner wall 35 is disposed to be contiguous with the flame stabilizing portion 18. The inner wall 35 is formed from a fiber-reinforced ceramic material as described later. A thermal insulator 37 of a porous ceramic material is inserted into a space 36 between the inner wall 35 and the outer vessel 34. A purge air inlet pipe 40 is connected to the outer vessel 34 to introduce air for purging into the space 36.

The fiber-reinforced ceramic material constituting the inner wall 35 is as follows. Fibers formed from a ceramic material are woven into a cloth. The cloth is coated with a binder-containing ceramic material. The coated cloth is formed into a cylindrical shape and solidified. Usually, a plurality of ceramic fiber layers are stacked on top of each other. By reinforcing the ceramic material with ceramic fibers in this way, the mechanical strength and the high-temperature strength can be improved. Thus, even when the inner wall 35 is exposed to a high temperature owing to combustion and subjected to thermal stress, cracking can be minimized. Further, it is also unlikely that the inner wall 35 will be etched or corroded by a corrosive gas such as a halogen gas generated as a result of combustion treatment. Accordingly, a long useful life can be obtained. Meanwhile, the thermal insulator 37 of a porous ceramic material may be such that fibers are made from a ceramic material and formed by a forming suction device so as to conform to the shape of the space 36.

Examples of ceramic materials usable for the thermal insulator 37 and the inner wall 35 include alumina having a purity of 80 to 99.7% and Si-based ceramic materials. To treat a waste gas containing fluorine, it is desirable to use alumina having high corrosion resistance to the fluorine-containing waste gas. If alumina continuous fibers are used as a fiber-reinforced ceramic material for the inner wall 35, the inner wall 35 is improved in heat resistance, wind velocity resistance and wear resistance and capable of withstanding large thermal shock and temperature gradient.

Figure 3:
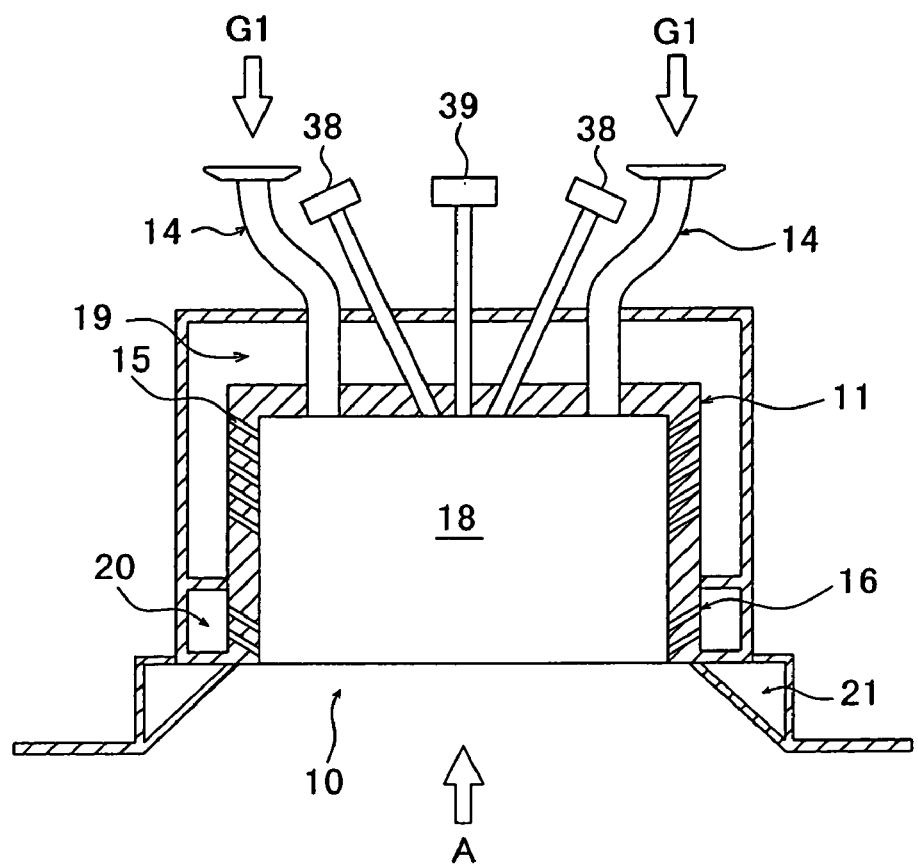
FIG. 3 is a diagram showing a structural example of a burner part in the waste gas treatment system according to the present invention.

The combustion chamber 30 is provided with a UV sensor 38 for detecting flames and a pilot burner 39 for ignition in the burner part 10. It should be noted that the UV sensor 38 and the pilot burner 39 may be installed on the top (the top plate of the burner part 10) of the cylindrical member 11, as shown in FIG. 3. The UV sensor 38 is disposed at a tilt with respect to the top of the cylindrical member 11 to detect formed flames from an oblique direction. The reason for this is that flames form swirling flows in the combustion chamber 30 and hence become short with respect to the radial direction. When silane ($SiH_4$) or the like is treated, dust of $SiO_2$ adheres to the inner wall surface of the combustion chamber 30, and it becomes impossible for the UV sensor 38 to detect flames. However, installing the UV sensor 38 on the top plate of the burner part 10 as stated above makes it possible to avoid the problem that the UV sensor 38 becomes unable to detect flames owing to the adhesion of dust. Further, to treat scarcely decomposable global warming gases (PFCs), a high temperature of 1300° C. or more is needed, and hence the piping is corroded by heat. However, high-temperature corrosion can be avoided by installing the UV sensor 38 and the pilot burner 39 on the top plate of the burner part 10 as stated above.

A discharge part 52 is provided at the bottom of the combustion chamber 30 with a cooled cooling part 51 interposed between the combustion chamber 30 and the discharge part 52. A plurality of nozzles 53 are provided on the lower edge of the cooling part 51 at equal spaces in the circumferential direction. Water is injected from the nozzles 53 toward the center to form a curtain of water, thereby cooling the waste gas and capturing particles contained in the waste gas. The side wall of the discharge part 52 is provided with an exhaust pipe 54 for discharging the treated waste gas. The bottom of the discharge part 52 is provided with a drain port 55 for discharging water injected from the nozzles 53.

Next, the operation of the waste gas treatment system according to the above-described embodiment will be described. First, the auxiliary burning gas is introduced and held in the auxiliary burning gas chamber 20 and blown off from the auxiliary burning gas nozzles 16, which are provided in the inner peripheral surface of the cylindrical member (inner cylinder) 11, toward the flame stabilizing portion 18 so as to produce swirling flows. When ignited by the pilot burner 39, the auxiliary burning gas forms swirling flames along the inner peripheral surface of the cylindrical member (inner cylinder) 11.

Hereupon, the auxiliary burning gas forms swirling flames, and swirling flames have the feature that they can burn stably over a wide range of equivalence ratios. In other words, because the flames swirl strongly, they supply heat and radicals to each other. Therefore, flame stabilizing properties are improved. Accordingly, even at such a small equivalence ratio that unburned gas may be generated or quenching may occur in the conventional system, the auxiliary burning gas can burn stably without generating unburnt gas and without causing pulsating combustion even in the vicinity of the equivalence ratio of 1.

Meanwhile, the waste gas G1 to be treated is blown off toward the flame stabilizing portion 18 from the waste gas inlet pipes 14, which open on the lower surface of the top of the cylindrical member 11. The waste gas G1 blown off mixes with the swirling flows of the auxiliary burning gas and burns. At this time, because the auxiliary burning gas is blown off from all the auxiliary burning gas nozzles provided in the circumferential direction so as to swirl strongly in one direction downstream of the nozzles, all the auxiliary burning gas mixes satisfactorily with the flames. Thus, the efficiency of combustion of the waste gas becomes very high.

If the auxiliary burning gas is overheated in excess of the ignition temperature thereof, it may initiate combustion in the auxiliary burning gas chamber 20 when an oxidizing agent is contained in the auxiliary burning gas. Therefore, it is necessary to effect cooling so that the temperature will not exceed the ignition temperature of the auxiliary burning gas. Further, research carried out by the present inventors reveals that swirling flames heat the cylindrical member 111 and the auxiliary burning gas in the auxiliary burning gas chamber 20. Accordingly, it is necessary in order to continue stable combustion to effect cooling so that the temperature will not exceed the heat resistance of the constituent material of the cylindrical member 11. The swirling air flows injected into the flame stabilizing portion 18 from the air nozzles 15 act to cool the auxiliary burning gas chamber 20.

Furthermore, flames from the auxiliary burning gas nozzles 16 are swirling, and the air injected from the air nozzles 15 is also swirling. Therefore, as they mix with the flames, the air flows further accelerate the swirling flows of the flames to form strong swirling flows. When swirling flames are formed, the pressure of the gas flow in the center of the swirl reduces. Consequently, self-circulating flows that flow backward from the forward ends of the flames toward the waste gas inlet pipes 14 and the auxiliary burning gas nozzles 16 occur in the center of the swirl. The circulating flows mix with the flames from the auxiliary burning gas nozzles 16 and the combustion gas, thereby suppressing the formation of NOx. Alternatively, it is possible to perform low-NOx combustion even if a premixed gas is used as an auxiliary burning gas and the equivalence ratio of the auxiliary burning gas is reduced.

Further, because the flames from the auxiliary burning gas nozzles 16 are swirling strongly, when the system is used to treat a gas that generates dust when it burns, such as silane gas, the swirling flows of the flames prevent silica ($SiO_2$), which results from the combustion of silane gas, from adhering to the waste gas inlet pipes 14 or the auxiliary burning gas nozzles 16. More specifically, when silane ($SiH_4$) or the like burns, powdery silica($SiO_2$) is formed. If the silica ($SiO_2$) adheres to the vicinities of the waste gas inlet pipes 14 or the auxiliary burning gas nozzles 16, it may reduce the amount of auxiliary burning gas blown off or change the gas blowing direction, causing the blowing off of the gas to be unstable. Under such circumstances, the blowing off of the gas cannot be stabilized, and it becomes impossible to perform stable combustion.

In this embodiment, because there are swirling flames from the auxiliary burning gas nozzles 16, the swirling flames cause fast flows to occur at the distal ends of the waste gas inlet pipes 14 and the auxiliary burning gas nozzles 16. The fast flows act to clean the distal end portions of the waste gas inlet pipes 14 and the auxiliary burning gas nozzles 16, thereby preventing the resulting powdery silica ($SiO_2$) from adhering to the distal end portions of the waste gas inlet pipes 14 and the auxiliary burning gas nozzles 16. This effect becomes even more remarkable in the presence of the swirling air flows from the air injection nozzles 15.

Further, the above-described effect does not confine itself to the distal end portions of the waste gas inlet pipes 14 and the auxiliary burning gas nozzles 16. That is, because the flames swirl in the combustion chamber 30, fast flows also occur along the wall surface of the combustion chamber 30. The fast flows clean the wall surface of the combustion chamber 30, thereby removing silica ($SiO_2$) from the wall surface. Thus, silica ($SiO_2$) attached to the distal end portions of the waste gas inlet pipes 14, the auxiliary burning gas nozzles 16 and the wall surface of the combustion chamber 30 is removed in a self-cleaning manner by the swirling flows.

As an example, a premixed gas containing an oxidizing agent is used as an auxiliary burning gas to be supplied, and the mixture ratio of the oxidizing agent to the fuel gas in the premixed gas is made lower than the stoichiometric oxidizing agent mixture ratio to form an over-rich premixed gas that is over-rich in fuel. The premixed gas is injected to swirl from the auxiliary burning gas nozzles 16, thereby forming primary swirling reducing flames in the flame stabilizing portion 18. The reducing flames and the waste gas from the waste gas inlet pipes 14 are brought into contact with each other to reductively decompose the waste gas, particularly a waste gas containing PFCs.

Next, oxygen is sufficiently given to the reducing flames in excess of the stoichiometric amount from the air injected from the air nozzles 15 and the secondary air nozzles 33 to create an excess oxygen condition, thereby forming secondary oxidizing flames. Oxidative decomposition of the waste gas is effected by the oxidizing flames. The waste gas is exposed to flames in two stages, i.e., reducing flames and oxidizing flames. Thus, the length of time that the waste gas is in contact with the flames is increased. Consequently, the high-temperature resident time can be lengthened. A waste gas containing PFCs has the property that it can be decomposed if the atmosphere temperature is raised and the high-temperature state is maintained for a long period of time. Thus, the waste gas is exposed to different flames in two stages, i.e., oxidizing and reducing flames, and the high-temperature state created by the flames is maintained for an extended period of time. By doing so, waste gas, particularly a gas containing PFCs, can be decomposed completely.

Because the auxiliary burning gas nozzles 16 face obliquely downward toward the downstream side of the flame stabilizing portion 18 to blow off the auxiliary burning gas so as to form swirling flows, flames blowing off from the auxiliary burning gas nozzles 16 form spiral swirling flows toward the downstream side of the flame stabilizing portion 18. Accordingly, the length of swirl when the swirling flames flow inside the cylindrical member 11 is shorter than in a case where the auxiliary burning gas is blown off horizontally. Consequently, an area where the flames heat the inner wall surface of the cylindrical member 11 narrows. Thus, heating of the inner peripheral wall of the cylindrical member 11 by the swirling flows and the rise in temperature are suppressed.

Thus, it is possible to extend the heat life of the constituent material of the cylindrical member 11. In addition, it is possible to reduce the amount of cooling air supplied from the air nozzles 15 and hence possible to suppress the reduction in flame temperature due to cooling and to maintain the high-temperature state. Accordingly, it is possible to increase the efficiency of decomposition of a halogen-containing waste gas, particularly a fluorocarbon-containing waste gas. Further, a plurality of auxiliary burning gas nozzles 16 may be provided so as to open in the tangential direction to the cylindrical member 11 as seen from above and open obliquely downward in a vertical plane. This arrangement also allows flames to form spiral swirling flows toward the downstream side of the flame stabilizing portion 18.

Although in this embodiment the secondary air nozzles 33 are directed downward, they may be arranged to inject secondary air toward the center of the cylindrical member 11. It is also possible to provide the secondary air nozzles 33 so that air injected from the nozzles forms swirling flows in the combustion chamber. With this arrangement, it is possible to cool the combustion-treated gas, discharge the treated gas to the outside of the combustion chamber 30, and remove silica ($SiO_2$) adhering to the wall surface of the combustion chamber 30, even more effectively. The way in which the nozzles are provided is the same as in the case of the above-described auxiliary burning gas nozzles 16.

It is also possible to provide an air injection nozzle in the top of the cylindrical member 11 so that air is supplied into the flame stabilizing portion 18 from this air injection nozzle to increase the oxygen density according to need, thereby allowing combustibility to be improved.

It is also possible to provide secondary combustion air holes in an extended peripheral wall of the flame stabilizing portion 18 downstream from the auxiliary burning gas nozzles 16 so as to form reducing flames for primary combustion and oxidizing flames for secondary combustion by the air in the flame stabilizing portion 18, thereby improving the decomposition rate of the waste gas G1, especially a halogen-containing waste gas, particularly a fluorocarbon-containing waste gas. In this case, it is preferable for the air holes to inject air toward the flame stabilizing portion 18 so as to form swirling flows for the reasons stated above. The air holes may be arranged to inject air toward the center of the cylindrical member 11 so that the air mixes turbulently with the waste gas after the primary combustion by the reducing flames.

Although an example in which flames blow off downward is shown, the present invention may also be applied to an arrangement in which flames blow off horizontally. The auxiliary burning gas is not necessarily limited to a premixed gas of hydrogen and oxygen but may be a fuel gas, e.g. hydrogen, city gas or LPG, or a premixed gas prepared by mixing together city (natural) gas or LPG and oxygen, air or oxygen enrichment air, as a matter of course.

An example of the process is as follows:

Gas to be treated: $CF_4$

Reductive decomposition reaction in reducing flames:

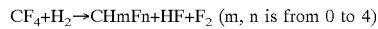

$CF_4 + H_2 \rightarrow CHmFn + HF + F_2$ (m, n is from 0 to 4)

Oxidative decomposition reaction:

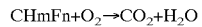

$CHmFn + O_2 \rightarrow CO_2 + H_2O$

In the combustion chamber 30, the ceramic material constituting the inner wall has excellent heat resistance and corrosion resistance. Therefore, wear due to heat and corrosion is minimized. In addition, because the ceramic material is reinforced with fibers, thermal stress cracking is prevented. Accordingly, the combustion chamber 30 can be used for a long period of time. Moreover, because there is no catalytic effect as occurs in the case of a metal, the formation of thermal NOx is suppressed even when the temperature in the combustion chamber 30 becomes high. Even when a halogen-containing gas is subjected to decomposition treatment, it is possible to suppress corrosion and etching of the inner wall 35 under high temperature by a halogen gas (HCl, HF, etc.) resulting from the decomposition treatment.

In particular, when a fiber-reinforced ceramic material having alumina as a raw material is used, the thermal conductivity under normal running conditions (600 to 1300° C.) is of the order of 0.65 to 0.88 (W/m.K), which is several hundred times higher than the average thermal conductivity of stainless steels or other similar metals, which is of the order of 0.0017 (W/m.K). Accordingly, thermal stress cracking is further reduced. Further, because the thermal insulator 37 made of a porous ceramic material is disposed on the outer periphery of the inner wall 35, the amount of heat loss can be reduced more than in the case of using the conventional inner wall made of a stainless steel or other similar metal. The same is the case with the use of other ceramic materials, e.g. an Si-based ceramic material.

From the purge air inlet pipe 40, air for purging is introduced into the space 36 between the outer vessel 34 and the inner wall 35 at a pressure slightly higher than the pressure in the combustion chamber 30. The air blows off into the combustion chamber 30 through the inner wall 35 and also through minute gaps at the ends of the inner wall 35 and mixes with the combustion gas and the waste gas before being discharged to the outside from the discharge part 52. Thus, hazardous and corrosive gases in the combustion chamber 30 can be prevented from leaking to the outside from the outer vessel 34.

Further, by forming the inner wall 35 of the combustion chamber 30 from a ceramic material as stated above, the occurrence of a catalytic action is prevented to accomplish low-NOx combustion. If the equivalence ratio of the auxiliary burning gas is reduced, even lower NOx combustion can be realized.

The following is a result of comparison between the amount of NOx generated in a combustor using an inner wall made of a ceramic material and that generated in a combustor using an inner wall made of a stainless steel. The two combustors were under the same conditions in terms of the type and so forth.

Combustion temperature: 1300° C. or more

Gas to be treated: $N_2$ gas

Concentration of NOx in exhaust gas

Inner wall made of ceramic material:
25 ppm

Inner wall made of stainless steel:
several 100 to several 1000 ppm

Figure 4:
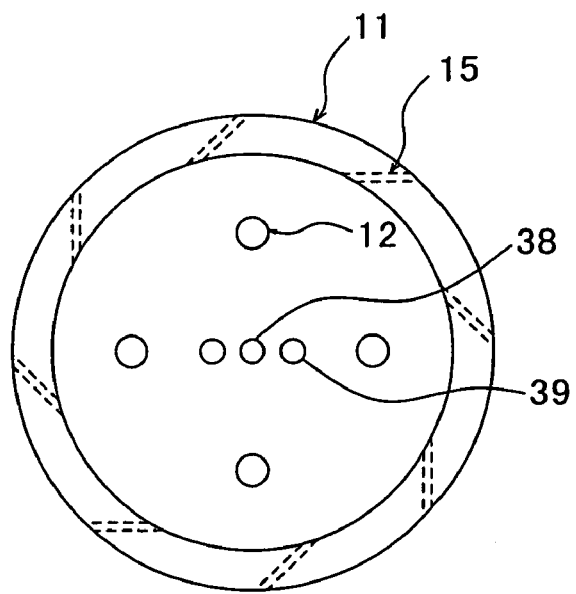
FIG. 4 is a diagram as seen in the direction of the arrow A in FIG. 3.

FIGS. 3 and 4 are diagrams showing another structural example of the burner part of the waste gas treatment system according to the present invention. FIG. 3 is a vertical sectional view, and FIG. 4 is a diagram as seen in the direction of the arrow A in FIG. 3. In the figures, portions denoted by the same reference symbols as those in FIGS. 1 and 2 are the same or corresponding portions. The same shall apply to other drawings. The burner part 10 in this example has a cooling jacket 21 provided at an outer peripheral portion of the cylindrical member 11 adjacent to the auxiliary burning gas chamber 20. The cooling jacket 21 is supplied with a cooling medium. Supplying a cooling medium to the cooling jacket 21 allows the cooling jacket 21 to cool the cylindrical member 11 heated by flames formed at the opening. As the cooling medium, any medium having a temperature difference may be used. That is, a liquid, e.g., water, or a gas, e.g., air, is used.

Pilot burners 39 are provided on the top (the top plate of the burner part 10) of the cylindrical member 11 at a predetermined angle of tilt. The reason for this is that an auxiliary burning gas (flames) injected from the auxiliary burning gas nozzles 16 becomes short with respect to the radial direction. Therefore, it is preferable to provide the pilot burners at a predetermined angle of tilt.

In the burner part 10 of the combustor shown in FIG. 1, the temperature in the cylindrical member 11 rises to 400° C. However, in the case of a water-cooled system, in particular, the temperature in the burner part 10 is reduced to 70° C. Accordingly, there is no danger that the auxiliary burning gas held in the auxiliary burning gas chamber 20 may ignite and explode. However, because the above-described secondary air nozzles are not provided, the lack of air is compensated for by increasing the amount of primary air from the air nozzles 15 or by increasing the amount of $O_2$ to be premixed. It should be noted that in this example the air nozzles 15 are provided to face obliquely downward to form swirling air flows in an obliquely downward direction. However, the air nozzles 15 may be provided horizontally, as shown in FIG. 1, so as to form swirling air flows horizontally, as a matter of course.

By forming the burner part 10 in a cooling structure as stated above, the temperature of the cylindrical member 11 is reduced, but the capacity of treating $C_2F_6$, which is a hardly decomposable gas, is reduced from 80% to 41% (the global warming coefficient of this gas is said to be 10,000 times as large as that of $CO_2$; it is demanded from the viewpoint of global warming control that $C_2F_6$ be decomposed 100%). This is considered due to the fact that the temperature of the burner part 10 is reduced, and this causes a reduction in the temperature of flames. The following is a description of the arrangement of a burner part capable of effectively cooling a fuel gas inlet for introducing an auxiliary burning gas to the auxiliary burning gas nozzles 16, which may explode when heated to high temperature.

Figure 5:
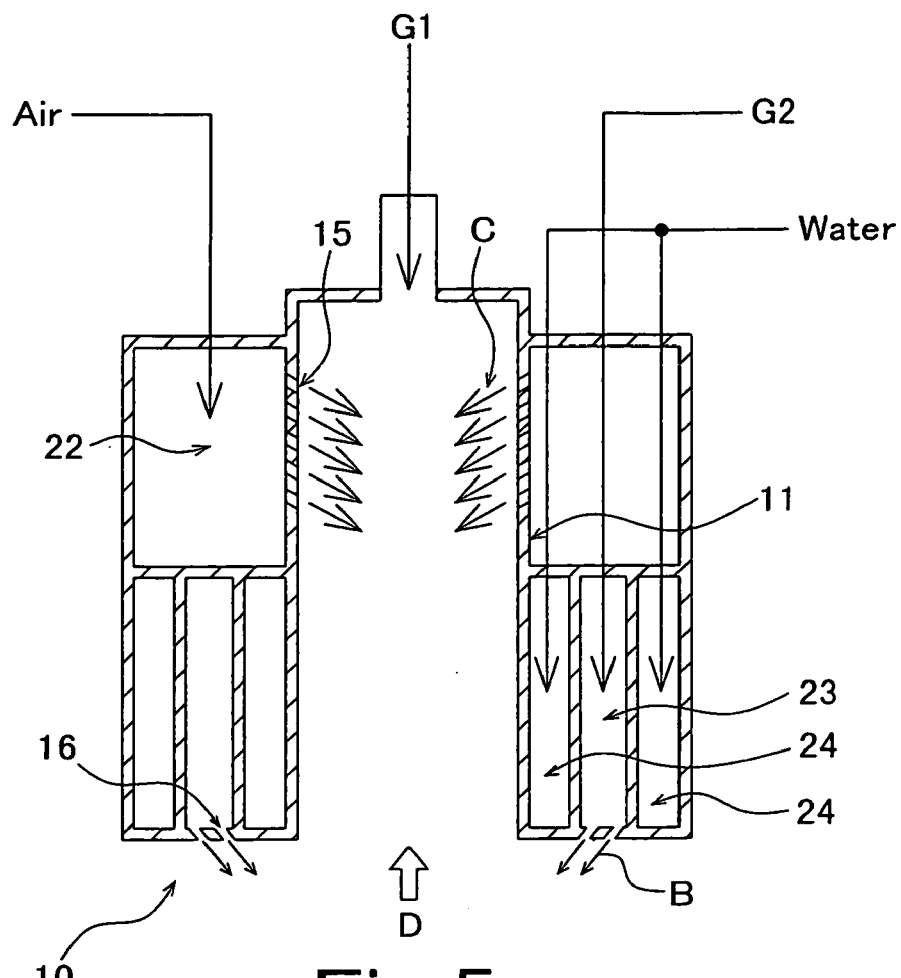
FIG. 5 is a diagram showing a structural example of a burner part in the waste gas treatment system according to the present invention.
Figure 6:
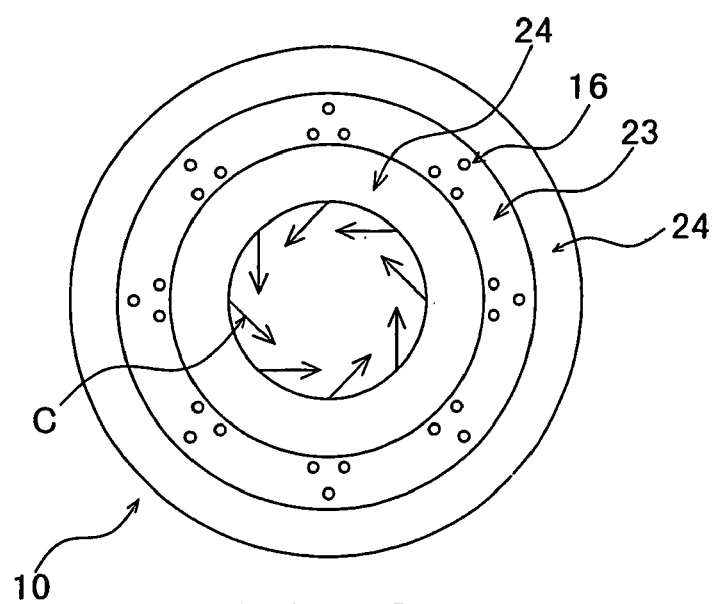
FIG. 6 is a diagram as seen in the direction of the arrow D in FIG. 5.

FIGS. 5 and 6 are diagrams showing another structural example of the burner part of the waste gas treatment system according to the present invention. FIG. 5 is a vertical sectional view, and FIG. 6 is a diagram as seen in the direction of the arrow D in FIG. 5. This burner part 10 has a cylindrical member 11. An air chamber 22 is provided around the outer periphery of an upper part of the cylindrical member 11. Further, a cooling jacket 24, an auxiliary burning gas chamber 23 and another cooling jacket 24 are concentrically provided around the outer periphery of a lower part of the cylindrical member 11. The inner peripheral wall of the cylindrical member 11 is provided with air nozzles 15 communicating with the air chamber 22. The bottom of the auxiliary burning gas chamber 23 is provided with auxiliary burning gas nozzles 16 communicating with the auxiliary burning gas chamber 23.

The auxiliary burning gas from the auxiliary burning gas nozzles 16 is injected toward the center below the opening of the cylindrical member 11 or obliquely downward so as to form swirling flows as shown by the arrows B. The air injected from the air nozzles 15 forms swirling flows swirling within the cylindrical member 11 as shown by the arrows C.

In the burner part 10 having the above-described arrangement, gas G1 to be treated, which is introduced into the cylindrical member 11, is mixed with the swirling air flows from the air nozzles 15 and further mixed with the auxiliary burning gas injected from the auxiliary burning gas nozzles 16 toward the lower side of the burner part 10. Upon ignition, flames are formed to extend toward the lower side of the opening of the cylindrical member 11. At this time, the auxiliary burning gas chamber 23 is cooled from both sides thereof by the cooling jackets 24. Accordingly, the temperature is held at a low level. In addition, because flames are formed below the cylindrical member 11, the reduction in temperature of the cylindrical member 11 does not exert a significant influence upon the flames.

Figure 7:
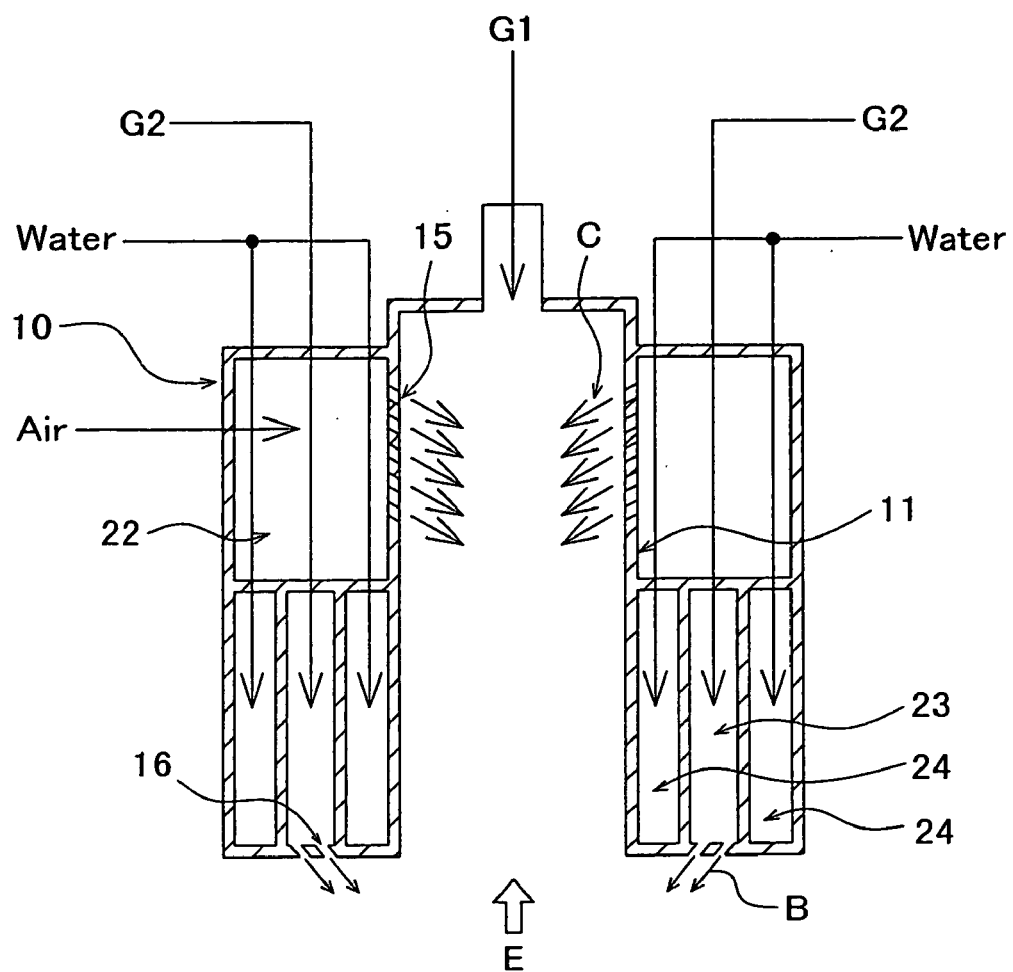
FIG. 7 is a diagram showing a structural example of a burner part in the waste gas treatment system according to the present invention.
Figure 8:
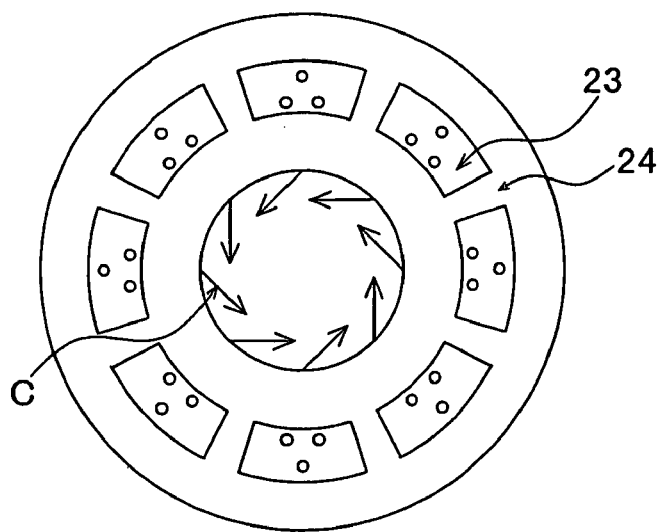
FIG. 8 is a diagram as seen in the direction of the arrow E in FIG. 7.

FIGS. 7 and 8 are diagrams showing another structural example of the burner part of the waste gas treatment system according to the present invention. FIG. 7 is a vertical sectional view, and FIG. 8 is a diagram as seen in the direction of the arrow E. This burner part 10 differs from the burner part 10 shown in FIGS. 5 and 6 in that auxiliary burning gas chambers 23 are provided in a cooling jacket 24 provided around the outer periphery of a cylindrical member 11, and the auxiliary burning gas chambers 23 are surrounded with a cooling medium. In addition, the bottom of each auxiliary burning gas chamber 23 is provided with auxiliary burning gas nozzles 16 communicating with the auxiliary burning gas chamber 23.

This burner part 10 is the same as the burner part 10 shown in FIGS. 5 and 6 in that the auxiliary burning gas from the auxiliary burning gas nozzles 16 is injected toward the center below the opening of the cylindrical member 11 or obliquely downward so as to form swirling flows as shown by the arrows B, and that the air injected from the air nozzles 15 forms swirling flows swirling within the cylindrical member 11 as shown by the arrows C.

In the burner part 10 having the above-described arrangement, waste gas G1 to be treated, which is introduced into the cylindrical member 11, is mixed with the swirling air flows from the air nozzles and further mixed with the auxiliary burning gas injected from the auxiliary burning gas nozzles 16 toward the lower side of the burner part 10. Upon ignition, flames are formed to extend toward the lower side of the opening of the cylindrical member 11. At this time, because the auxiliary burning gas chambers 23 are surrounded with the cooling medium in the cooling jacket 24, the auxiliary burning gas chambers 23 are cooled, and the temperature is held at a low level. In addition, because flames are formed below the cylindrical member 11, the reduction in temperature of the cylindrical member 11 does not exert a significant influence upon the flames as in the case of the burner part 10 shown in FIGS. 5 and 6.

Figure 9:
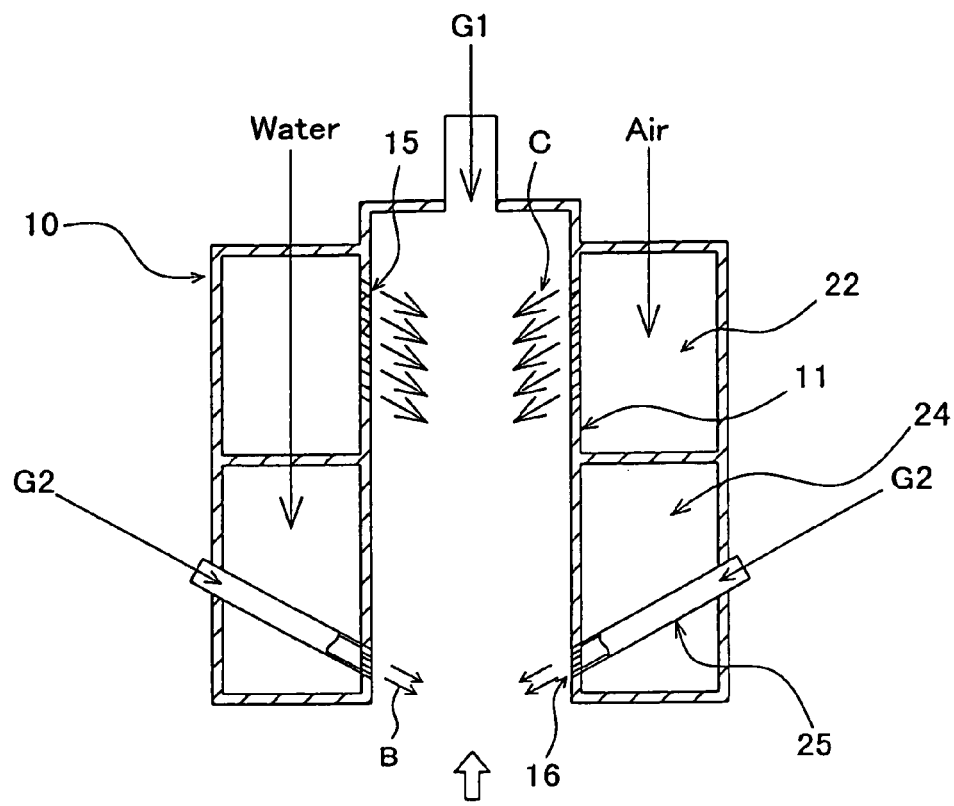
FIG. 9 is a diagram showing a structural example of a burner part in the waste gas treatment system according to the present invention.
Figure 10:
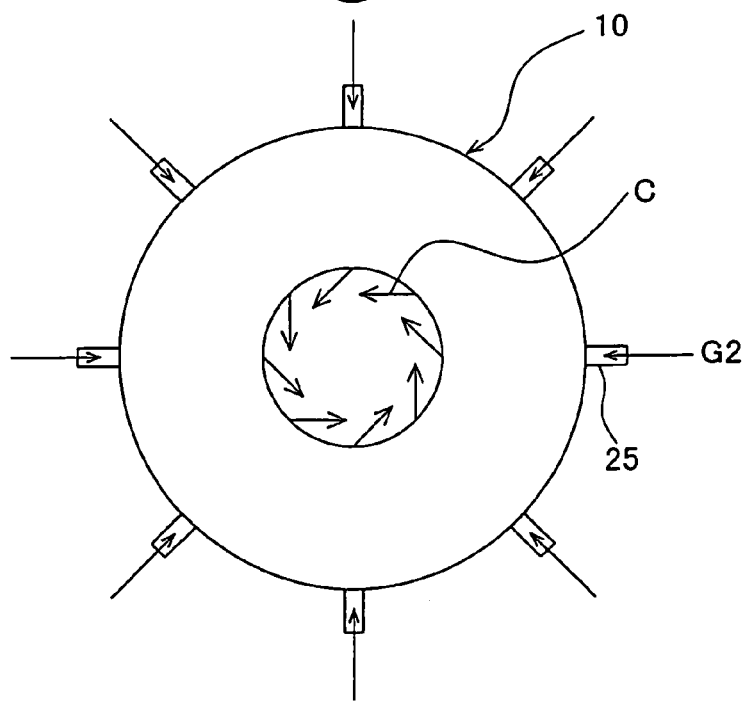
FIG. 10 is a diagram as seen in the direction of the arrow F in FIG. 9.

FIGS. 9 and 10 are diagrams showing another structural example of the burner part of the waste gas treatment system according to the present invention. FIG. 9 is a vertical sectional view, and FIG. 10 is a diagram as seen in the direction of the arrow F. This burner part 10 differs from the burner part 10 shown in FIGS. 5 and 6 in that cylindrical auxiliary burning gas chambers 25 are disposed in a cooling jacket 24 formed around the outer periphery of a cylindrical member 11. Auxiliary burning gas nozzles 16 are provided at the distal end of each cylindrical auxiliary burning gas chamber 25. The cylindrical auxiliary burning gas chambers 25 are disposed to extend through the cooling jacket 24 obliquely so that the auxiliary burning gas nozzles 16 are at the lower end of each auxiliary burning gas chamber 25.

This burner part 10 is approximately the same as the burner part 10 shown in FIGS. 5 and 6 in that the auxiliary burning gas from the auxiliary burning gas nozzles 16 is injected toward the center below the opening of the cylindrical member 11 or obliquely downward so as to form swirling flows as shown by the arrows B, and that the air injected from the air nozzles 15 forms swirling flows swirling within the cylindrical member 11 as shown by the arrows C.

In the burner part having the above-described arrangement, waste gas G1 to be treated, which is introduced into the cylindrical member 11, is mixed with the swirling air flows from the air nozzles 15 and further mixed with the fuel gas injected from the auxiliary burning gas nozzles 16 toward the lower side of the burner part 10. Upon ignition, flames are formed to extend toward the lower side of the opening of the cylindrical member 11. At this time, because the auxiliary burning gas chambers 25 are surrounded with the cooling medium in the cooling jacket 24, the auxiliary burning gas chambers 25 are cooled, and the temperature is held at a low level. In addition, because flames are formed below the cylindrical member 11, the reduction in temperature of the cylindrical member 11 does not exert a significant influence upon the flames as in the case of the burner part 10 shown in FIGS. 5 and 6.

Figure 11:
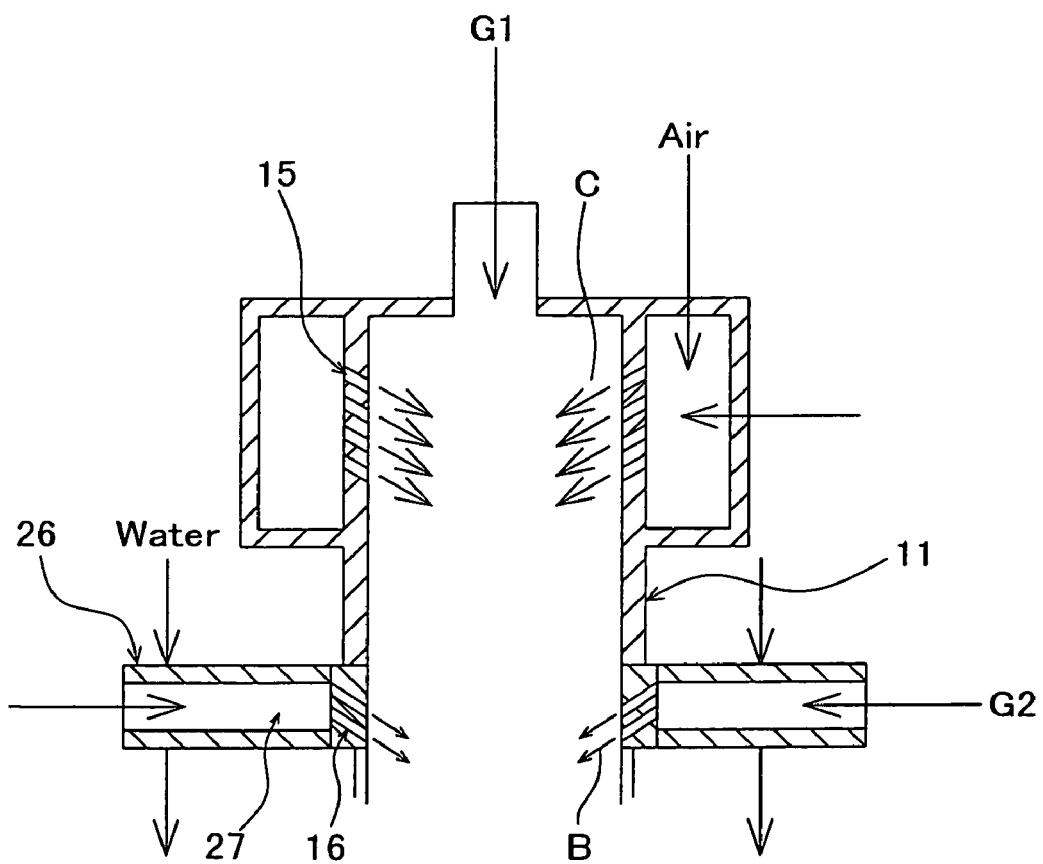
FIG. 11 is a diagram showing a structural example of a burner part in the waste gas treatment system according to the present invention.
Figure 12:
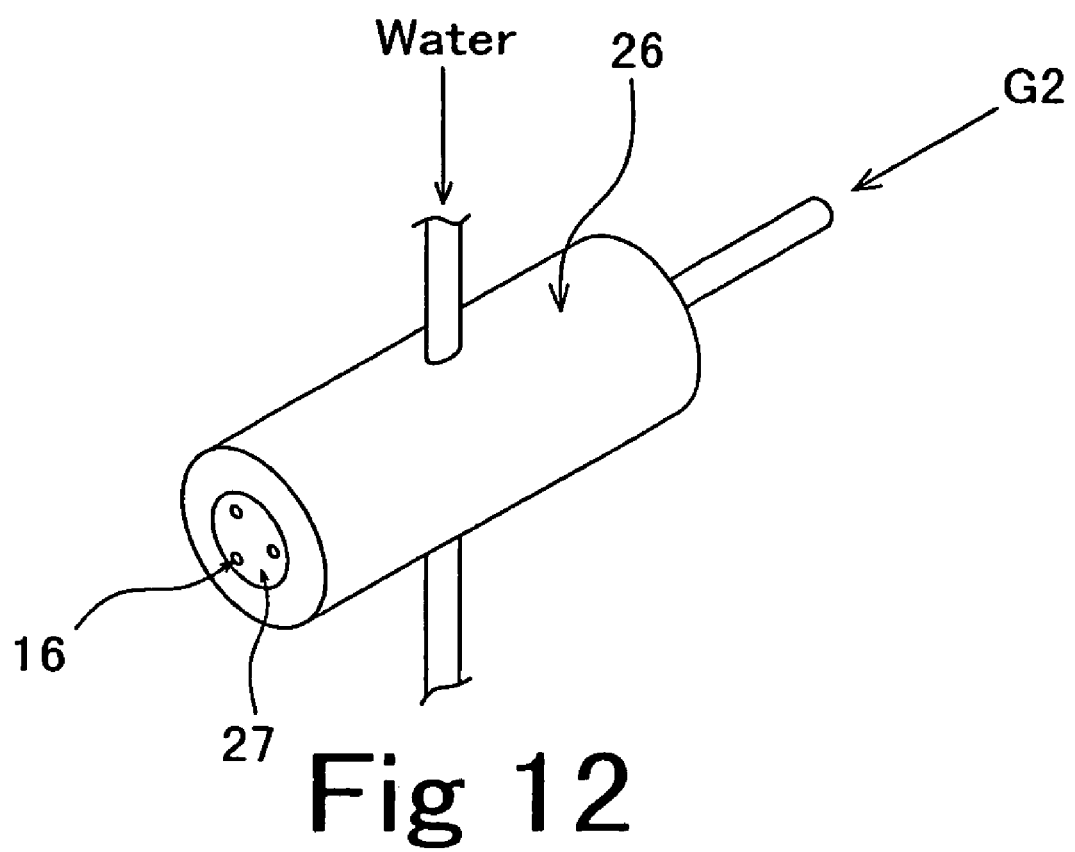
FIG. 12 is a diagram showing the external appearance of a cooling jacket in FIG. 11.

FIGS. 11 and 12 are diagrams showing another structural example of the burner part of the waste gas treatment system according to the present invention. FIG. 11 is a vertical sectional view, and FIG. 12 is a diagram showing the external appearance of a cooling jacket 26. This burner part 10 differs from the burner part 10 shown in FIGS. 5 and 6 in that cooling jackets 26 are provided on the outer periphery of a lower part of the cylindrical member 11, and a cylindrical auxiliary burning gas chamber 27 is disposed in each cooling jacket 26. Auxiliary burning gas nozzles 16 are provided at the distal end of the cylindrical auxiliary burning gas chamber 27 so as to extend obliquely toward the lower side of the opening of the cylindrical member 11 and at a predetermined angle to the tangential direction to the inner peripheral surface.

The auxiliary burning gas from the auxiliary burning gas nozzles 16 is injected toward the center below the opening of the cylindrical member 11 or obliquely downward so as to form swirling flows as shown by the arrows B. The air injected from the air nozzles 15 swirls within the cylindrical member 11, as shown by the arrows C, as in the case of the burner part 10 shown in FIGS. 5 and 6.

In the burner part 10 having the above-described arrangement, the gas to be treated, which is introduced into the cylindrical member 11, is mixed with the swirling air flows from the air nozzles 15 and further mixed with the auxiliary burning gas injected from the auxiliary burning gas nozzles 16 toward the lower side of the burner part 10. Upon ignition, flames are formed to extend toward the lower side of the opening of the cylindrical member 11. At this time, because the auxiliary burning gas chambers 27 are surrounded with the cooling medium in the cooling jackets 26, the auxiliary burning gas chambers 27 are cooled, and the temperature is held at a low level. In addition, because flames are formed below the cylindrical member 11, the reduction in temperature of the cylindrical member 11 does not exert a significant influence upon the flames as in the case of the burner part 10 shown in FIGS. 5 and 6.

There are gases that give rise to a problem when made harmless by heat decomposition in a combustor, such as waste gases containing $SiH_4$ and so forth. That is, when such a waste gas is subjected to heat decomposition in a combustor to make it harmless, dust such as $SiO_2$ is generated and adheres to the inner wall of the cylindrical member 11 in the burner part 10 and the inner wall of the combustion chamber 30 and also to the inner wall of piping subsequent to the combustion chamber, causing the exhaust pressure loss to increase. Therefore, the waste gas combustor of the waste gas treatment system according to the present invention is provided with a dust remover for removing dust from the inner wall thereof.

Figure 13:
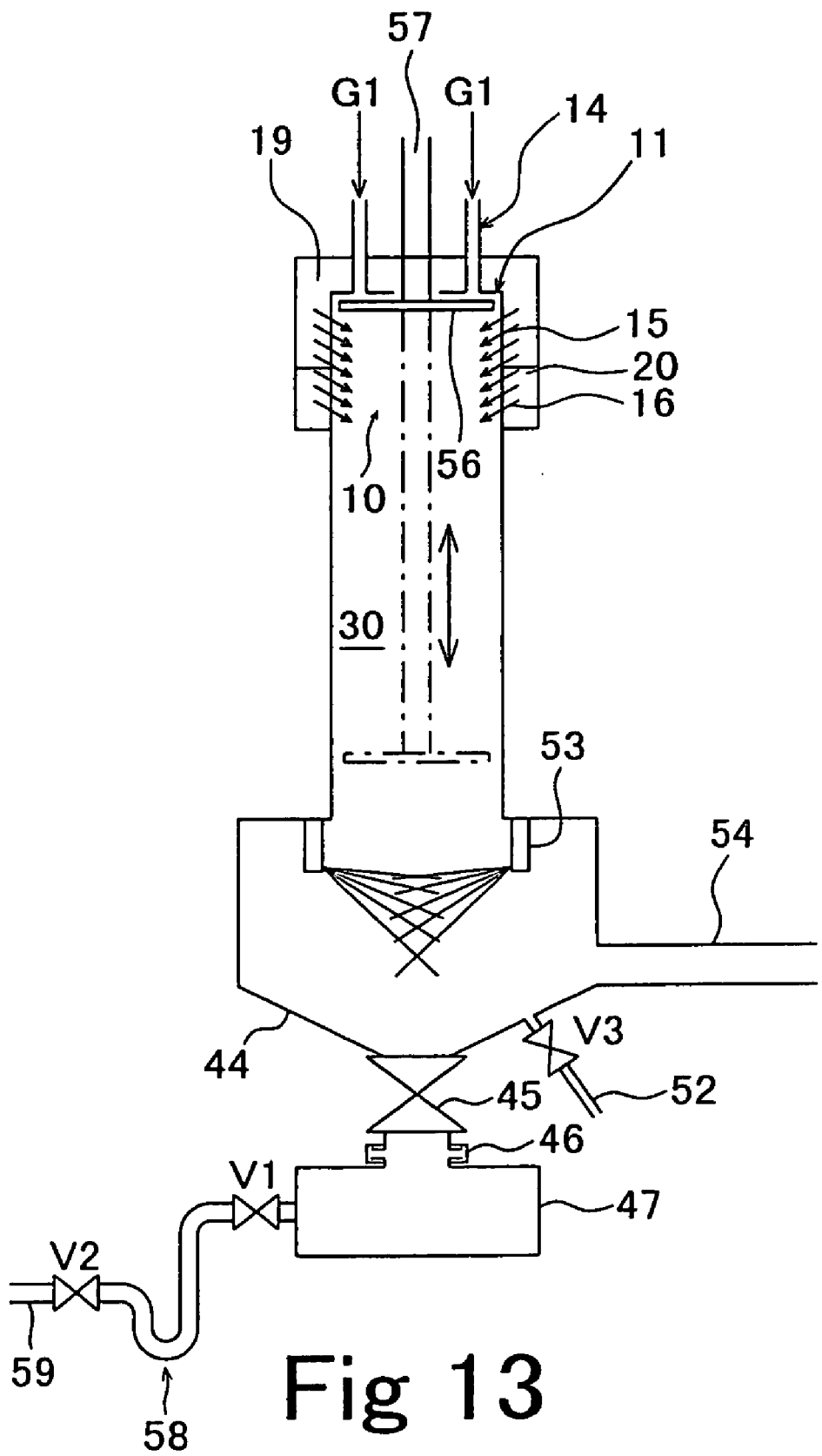
FIG. 13 is a diagram showing a structural example of a dust remover in the waste gas treatment system according to the present invention.
Figure 14:
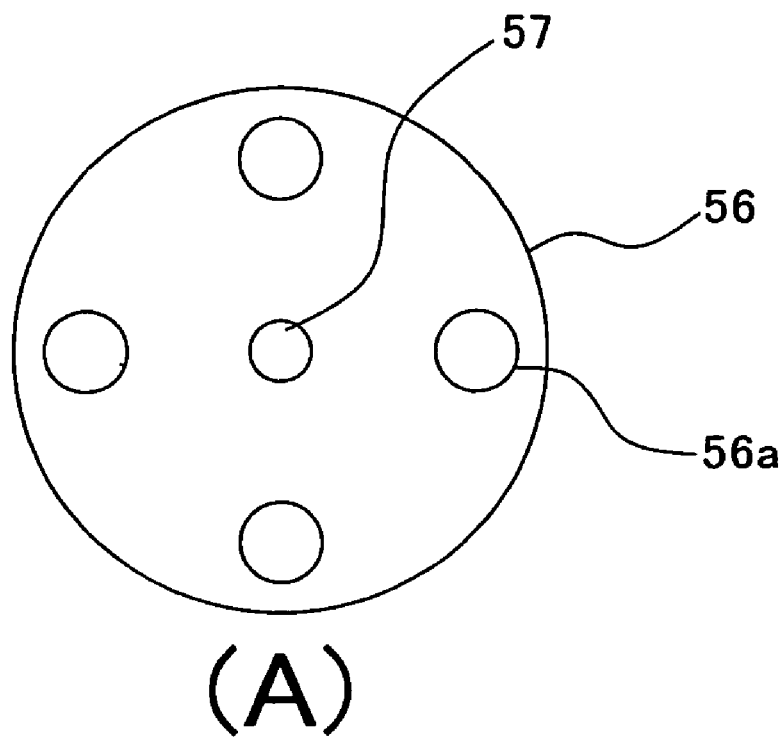
FIGS. 14(A) and (B) are plan views of a scraping plate in FIG. 13.
Figure 14:
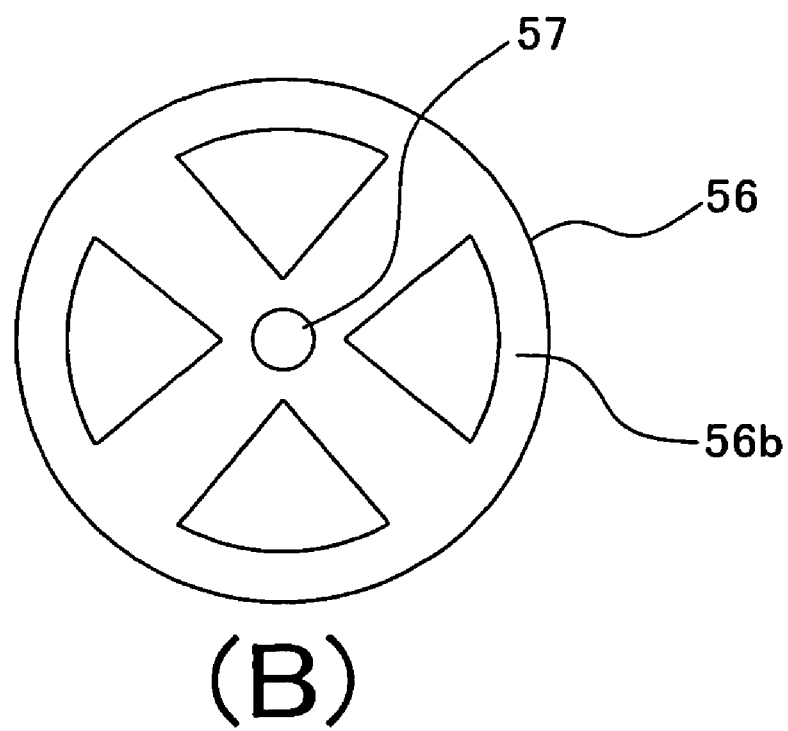

FIG. 13 is a diagram showing a structural example of a dust remover. As illustrated in the figure, the dust remover has a scraping plate 56 secured to the distal end of a shaft 57 vertically moving between the burner part 10 and the combustion chamber 30. By vertically moving the scraping plate 56, dust attached to the inner wall surfaces of the burner part 10 and the combustion chamber 30 is scraped off. As shown in FIGS. 14(A) and (B), the scraping plate 56 is formed with circular holes 56a or sectorial holes 56b, which are larger than the opening of each waste gas inlet pipe 14. Thus, when the scraping plate 56 is raised to the uppermost, withdrawn position (the solid-line position in FIG. 13), the holes 56a correspond to the respective openings of the waste gas inlet pipes 14 so that the scraping plate 56 will not interfere with the flow of waste gas flowing into the burner part 10 (into the cylindrical member 11) from the waste gas inlet pipes 14. In addition, when the scraping plate 56 is raised to the withdrawn position, it will not interfere with the swirling flows of air and auxiliary burning gas blowing off from the air nozzles 15 and the auxiliary burning gas nozzles 16.

A cooling receiver 44 is provided at the lower end of the combustion chamber 30 to cool the waste gas burned in the combustion chamber 30 and to receive dust scraped off with the scraping plate 56. A shut-off valve 45 is installed at the lower end of the cooling receiver 44, and a dust tank 47 is secured to the lower end of the shut-off valve 45 through a clamp 46. The cooling receiver 44 is provided with an exhaust pipe 54 and a drain port 52. Further, a U trap 58 is connected to the dust tank 47 through a valve V1, and a drain pipe 59 is connected to the U trap through a valve V2.

In the dust remover having the above-described arrangement, when it is detected that a predetermined amount of dust is attached to the inner wall surfaces of the burner part 10 and the combustion chamber 30, the shaft 57 is moved vertically by a manual or automatic operation, whereby the attached dust is scraped off and dropped into the cooling receiver 44 with the scraping plate 56. Dust is stored in the cooling receiver 44 while water is being drained through the drain port 52 by opening a valve V3. When the amount of dust stored reaches a predetermined value, the shut-off valve 45 is opened to put the dust into the dust tank 47. Then, the shut-off valve 45 is closed, and the valves V1 and V2 are opened to drain waste water from the dust tank 47 through the drain pipe 59 via the U trap 58. The reason for providing the U trap 58 is that if waste water is drained directly through the drain pipe 59, hazardous gases are undesirably discharged simultaneously.

It should be noted that the dust scraping operation may be performed as follows. The amount of dust attached is detected with a detecting means (e.g., a pressure sensor for detecting the pressure in the combustion chamber 30, a temperature sensor for detecting the wall surface temperature of the combustion chamber 30, or a monitor for monitoring the amount of dust attached to the inner wall surface), and when the amount of dust attached reaches a predetermined value, the shaft 57 is automatically moved vertically to scrape off the dust. The arrangement may also be such that a timer is provided, and when a predetermined period of operating time has elapsed, the shaft 57 is moved vertically to scrape off the dust. The scraping plate 56 and so forth are made of a corrosion-resistant and heat-resistant material, e.g., a ceramic material.

The arrangement may be such that, although illustration thereof is omitted, the dust tank 47 is provided with a transparent observation port for checking the amount of dust collected in the dust tank 47 and a dust detecting sensor, e.g., a photoelectric sensor, for detecting that a predetermined amount of dust has been collected, together with a water supply pipe for supplying water into the dust tank 47. When a predetermined amount of dust has been collected in the dust tank 47, the shut-off valve 45 is closed, and the valves V1 and V2 are opened to supply water into the dust tank 47 from the above-described water supply pipe so as to wash away the dust, thereby carrying away the dust from the dust tank 47 through the U trap 58.

The arrangement may also be such that water and dust are cast into the dust tank 47 from the cooling receiver 44 by opening the shut-off valve 45 and the valves V1 and V2 without providing the drain port 52, and water is drained through the U trap 58.

Figure 15:
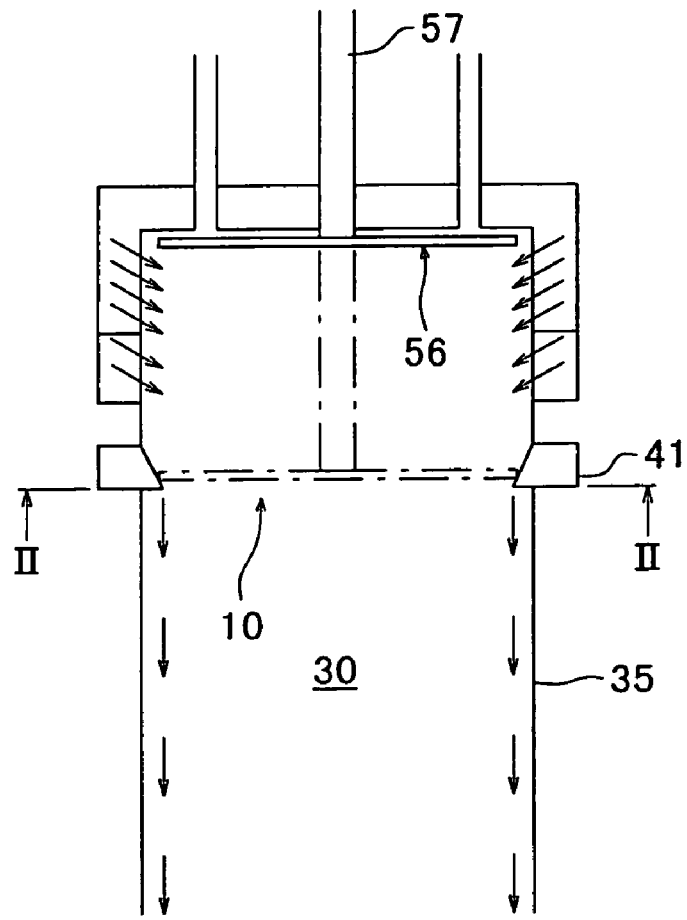
FIG. 15 is a diagram showing a structural example of a dust remover in the waste gas treatment system according to the present invention.

Although in the structural example in FIG. 13 the scraping plate 56 is moved vertically between the burner part 10 and the combustion chamber 30, it may be arranged to move vertically only in the burner part 10 as shown in FIG. 15. Further, the withdrawn position is not necessarily limited to the top of the burner part 10. For example, the withdrawn position may be set at the bottom of the combustion chamber 30 by providing a driving mechanism for vertically moving the shaft 57 at the lower side of the combustion chamber 30 or the cooling receiver 44.

Figure 16:
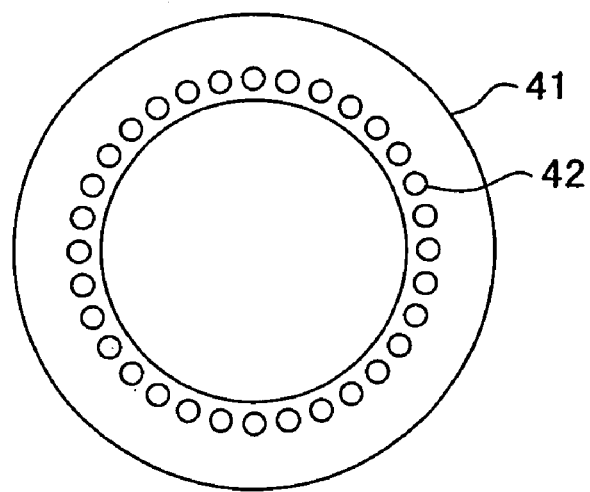
FIG. 16 is a sectional view as seen in the direction of the arrow II—II in FIG. 15.

FIG. 15 is a diagram showing another structural example of the dust remover. As illustrated in the figure, the dust remover has a scraper installed in the burner part 10. The scraper has a scraping plate 56 provided at the distal end of a shaft 57 as shown in FIG. 13. By vertically moving the shaft 57, dust attached to the inner wall is scraped off. A ring-shaped air chamber 41 is provided on top of the combustion chamber 30. As shown in FIG. 16, the bottom of the air chamber 41 is provided with a multiplicity of air injection nozzles 42. Air is blown off from the air injection nozzles 42 downward or obliquely downward along the wall surface of the combustion chamber 30, thereby blowing off dust from the inner wall surface of the combustion chamber 30. In addition, a layer of air stream flowing downward from the upper side is formed to prevent adhesion of dust to the inner wall surface by the layer of air stream.

At the lower end of the combustion chamber 30, a cooling receiver 44 and so forth are provided as in the case of FIG. 13, although illustration thereof is omitted. It should be noted that the vertical movement of the shaft 57 is effected by a manual or automatic operation or every time a predetermined period of operating time measured with a timer has elapsed as in the case of the dust remover shown in FIG. 13.

In the above-described example, dust attached to the inner wall of the burner part 10 is scraped off with the scraping plate 56 secured to the shaft 57 and air is blown along the inner wall surface of the combustion chamber 30 to blow off the attached dust, or a layer of air stream is formed to prevent adhesion of dust. It should be noted, however, that a layer of air stream may be formed over the inner wall surfaces of both the burner part 10 and the combustion chamber 30 to prevent adhesion of dust.

If air is intermittently blown off from the air injection nozzles 42, dust attached to the inner wall surface can be removed with a minimal amount of air blown.

Figure 17:
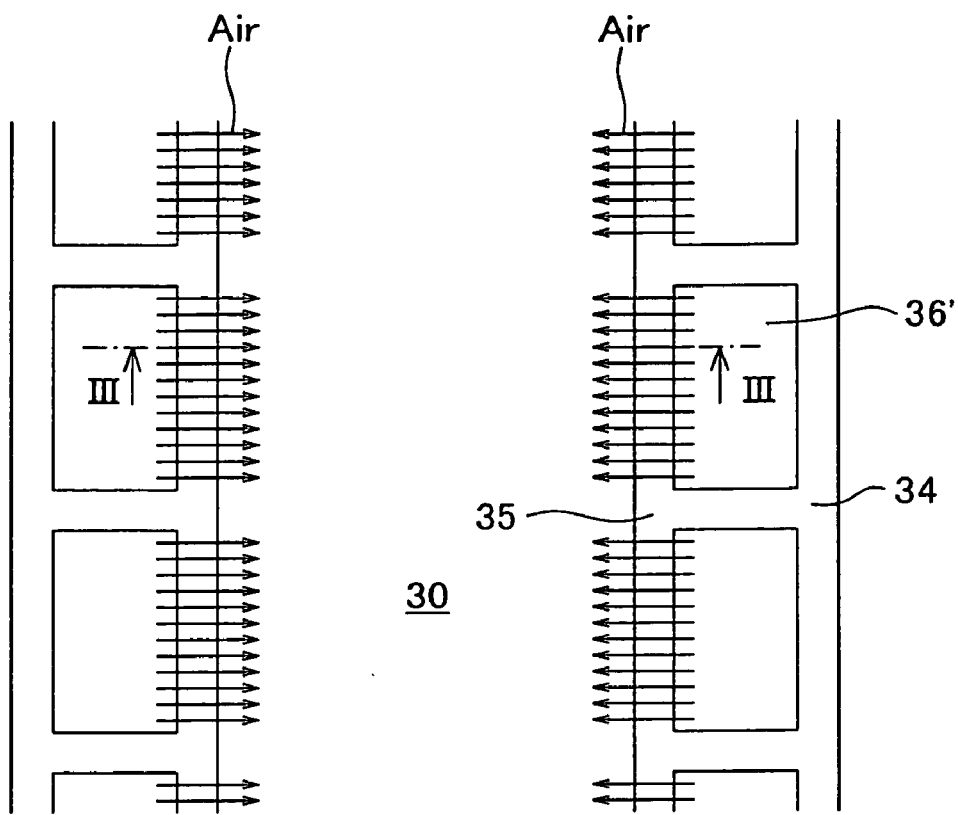
FIG. 17 is a diagram showing a structural example of a dust remover in the waste gas treatment system according to the present invention.
Figure 18:
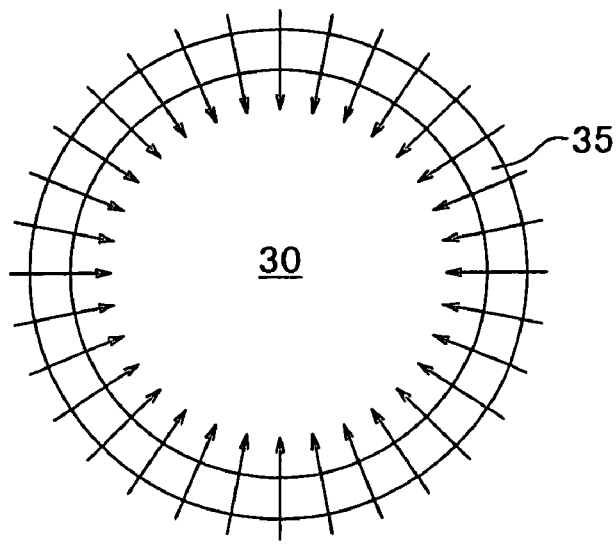
FIG. 18 is a sectional view as seen in the direction of the arrow III—III in FIG. 17.

FIGS. 17 and 18 are diagrams showing another structural example of the dust remover. FIG. 17 is a vertical sectional view of a combustion chamber, and FIG. 18 is a sectional view as seen in the direction of the arrow III—III in FIG. 17. The inner wall 35 is formed from a porous material (e.g., a granular filter, porous ceramics, or a heat-resistant plate material bored with a multiplicity of small holes). In addition, a plurality of independent annular air chambers 36' are provided between the inner wall 35 made of the porous material and the outer vessel 34. Each air chamber is connected to an air source so as to be supplied with compressed air from the air source, whereby air is uniformly blown into the combustion chamber 30 through the pores of the inner wall 35. The air blown in this way removes dust from the inner wall or uniformly prevents adhesion of dust to the inner wall 35.

In the dust remover having the above-described arrangement, air may be continuously blown from the pores of the inner wall 35 during the operation of the waste gas treatment system. However, depending upon the situation, the arrangement may be such that when it is detected with the above-described detecting means that a predetermined amount of dust has attached to the inner wall, air is blown to remove the attached dust. Air may be blown every time a predetermined period of time has elapsed.

Figure 19:
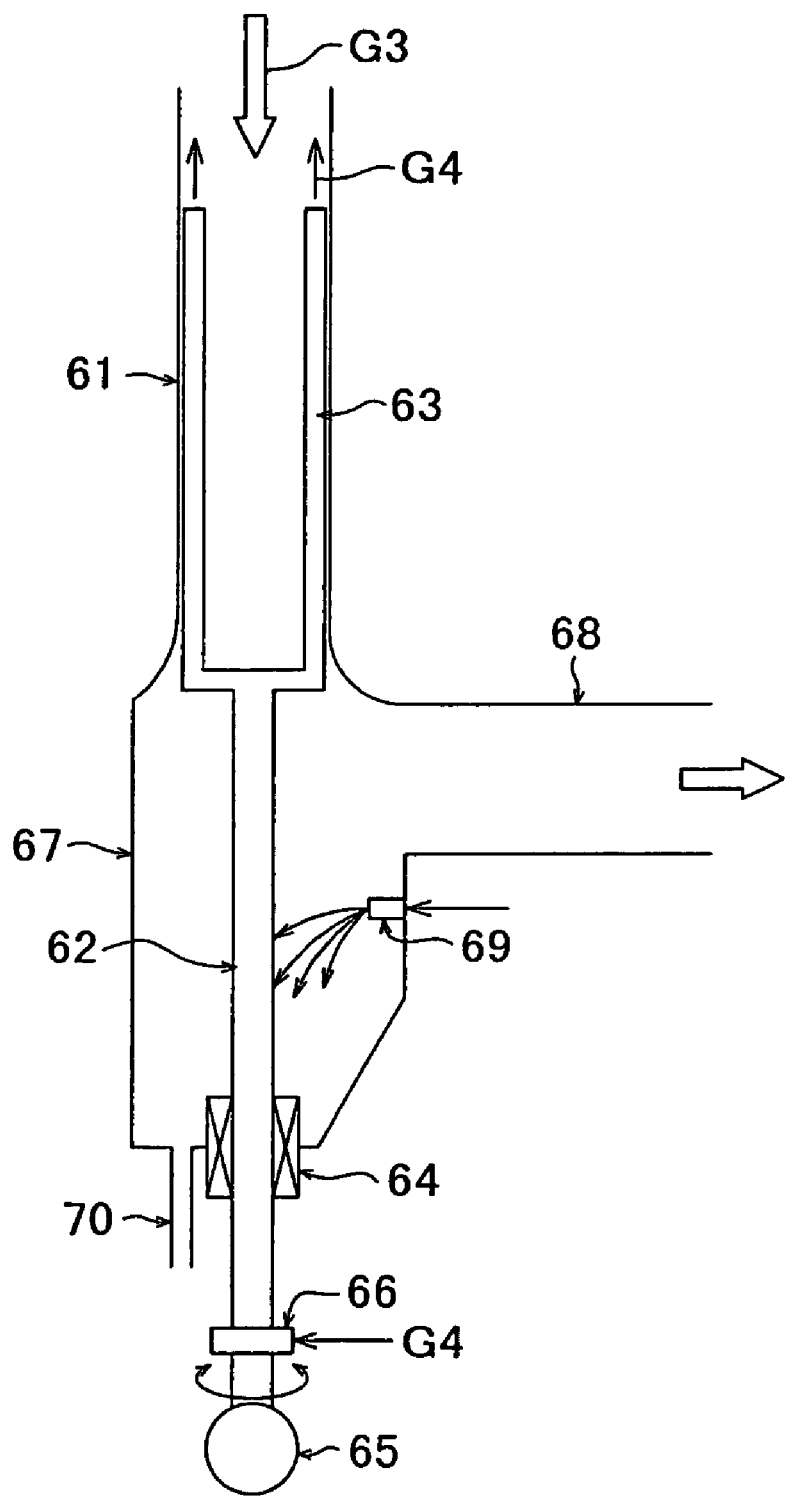
FIG. 19 is a diagram showing a structural example of a dust remover in piping according to the present invention.

FIG. 19 is a vertical sectional view showing a structural example of a dust remover for removing dust from the piping inner wall when a gas containing dust flows. As shown in the figure, the dust remover has a scraping mechanism installed in piping 61 through which a dust-containing waste gas G3 flows. The scraping mechanism has a main shaft 62 and two rod-shaped scraping members 63 secured to the main shaft 62 to extend in the longitudinal direction of the main shaft 62. The dust remover has a support seal mechanism 64 for supporting the main shaft 62 of the scraping mechanism so that the scraping members 63 contact the inner surface of the piping 61 or lie with a slight gap therebetween. In addition, the support seal mechanism 64 has a sealing function. The dust remover further has a driving mechanism 65 for continuously or periodically oscillating (rotational reciprocating motion through a predetermined angle) or rotating the scraping mechanism about the main shaft 62.

The main shaft 62 and the scraping members 63 are hollow pipes, respectively, and the hollow portions of these pipes communicate with each other. A cleaning gas G4 supplied through a joint 66, e.g., a rotary joint, is passed through the hollow portion of the main shaft 62 and the hollow portions of the scraping members 63 and blown into the piping 61 from the distal (upper) ends of the scraping members 63. A dust receiver 67 is provided at the lower end of the piping 61, and a water injection nozzle 69 is provided on the inner wall surface of the dust receiver 67 to inject water. A drain pipe 70 is provided in the bottom of the dust receiver 67.

In the dust remover having the above-described arrangement, gas G3 containing dust, which flows into the piping 61, is discharged through an exhaust pipe 68, and dust adheres to the inside of the piping 61. When the scraping mechanism is continuously or periodically oscillated or rotated about the main shaft 62 by the driving mechanism 65, the dust attached to the inner wall of the piping 61 is scraped off with the scraping members 63 and drops into the dust receiver 67. At this time, a cleaning gas G4, e.g., air, is continuously or intermittently injected from the distal ends of the scraping members 63. Thus, it is possible to remove dust even in an area that cannot be reached by the scraping members 63.

Dust removed by this method drops into the dust receiver 67 in the state of being fine particles. Therefore, injection of water into the dust receiver 67 from the water injection nozzle 69 allows the dust to be discharged to the outside from the drain pipe 70 without causing clogging. When the waste gas G1 is a corrosive gas, the cleaning gas G4 is mixed with ammonia gas, whereby the inner surface of the piping 61 is neutralized and thus the progress of corrosion can be prevented.

Figure 20:
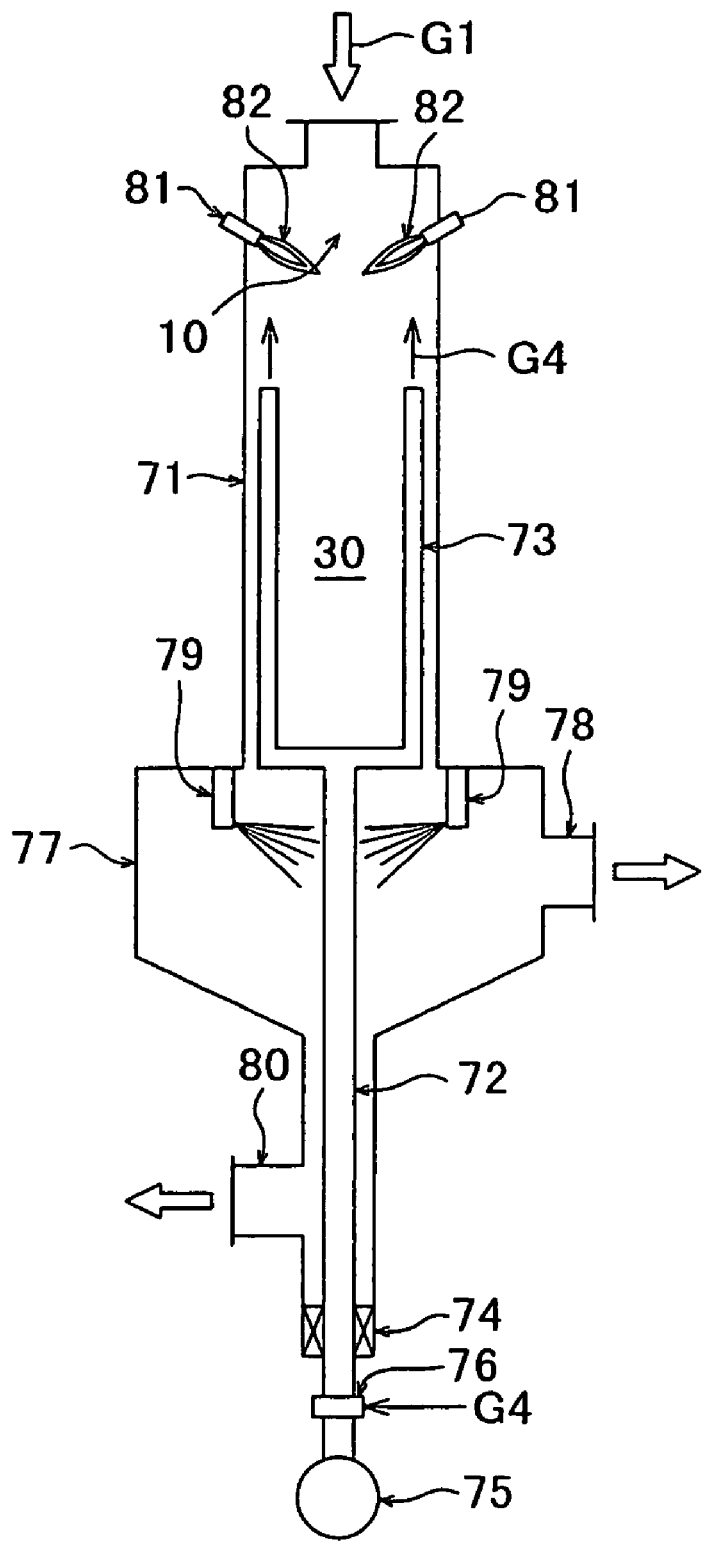
FIG. 20 is a diagram showing a structural example of a dust remover in the waste gas treatment system according to the present invention.

FIG. 20 is a diagram showing a structural example of the dust remover arranged as shown in FIG. 19 in a case where it is provided in a waste gas combustor of a waste gas treatment system. As illustrated in the figure, the dust remover includes a scraping mechanism provided in a combustion chamber 30 into which waste gas G1 from semiconductor manufacturing equipment flows. The scraping mechanism has a main shaft 72 and two rod-shaped scraping members 73 secured to the main shaft 72 to extend in the longitudinal direction of the main shaft 72. A support seal mechanism 74 supports the main shaft 72 of the scraping mechanism so that the scraping members 73 move in the inner peripheral direction in contact with the inner surface of the combustion chamber 30 or with a slight gap therebetween. The support seal mechanism 74 further has a sealing function. The dust remover further includes a driving mechanism 75 for continuously or periodically oscillating or rotating the scraping mechanism about the main shaft 72.

A cleaning gas G4 supplied through a joint 76, e.g., a rotary joint, is passed through the hollow portion of the main shaft 72 and the hollow portions of the scraping members 73 and injected from the upper ends of the scraping members 73 into piping 71 constituting the combustion chamber 30. Burners 81 are provided in an upper part of the inner wall surface of the combustion chamber 30 that constitutes a burner part 10. A cooling receiver 77 is provided at the lower end of the combustion chamber 30. An exhaust port 78 is provided in a side portion of the cooling receiver 77. The upper surface of the inner wall of the cooling receiver 77 is provided with water injection nozzles 79 for injecting water. In addition, a drain port 80 is provided in a lower end portion of the cooling receiver 77 to communicate with the inside of the cooling receiver 77.

Waste gas G1 from semiconductor manufacturing equipment or the like is heated with flames formed by the burners 81. As a result, the waste gas G1 is made harmless and becomes a high-temperature waste gas containing dust at a high density. Because the temperature of flames 82 formed by the burners 81 reaches about 2000° C., it is considered that most substances are melted upon contacting the flames 82 directly. Because the inner wall surface temperature of the combustion chamber 30 immediately downstream the burners 81 is lower than 2000° C., dust is likely to adhere to the inner wall surface of the combustion chamber 30. This may cause blockage. The same is the case with the vicinities of the burners 81.

By rotating or oscillating the scraping mechanism about the main shaft 72 by the driving mechanism 75 under the above-described environmental conditions, dust attached to the inner wall surface of the combustion chamber 30 can be scraped off directly with the scraping members 73. Thus, blockage due to adhesion of dust can be prevented. Even in an area where the scraping members 73 cannot be inserted because the flames 82 would touch them, dust attached to the inner wall surface can be removed with the cleaning gas G4 supplied through the joint 76, e.g., a rotary joint, and blown off from the upper ends of the scraping members.

The waste gas G1 heated and burned with the flames 82 flows into the cooling receiver 77, in which it is cooled with water injected from the water injection nozzles 79 and then discharged from the exhaust port 78. In addition, water containing dust scraped off is discharged from the drain port 80.

Figure 21:
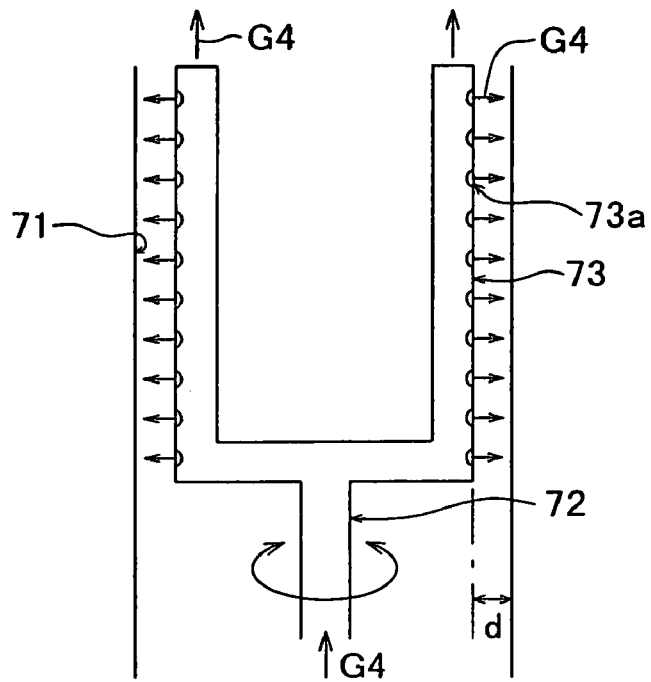
FIG. 21 is a diagram showing a structural example of a dust remover in piping according to the present invention.

FIG. 21 is a diagram showing another structural example of the main shaft 72 and the scraping members 73 of the above-described scraping mechanism. In this scraping mechanism, as illustrated in the figure, a multiplicity of small holes 73a are provided in the outer peripheral surface of each scraping member 73 so as to communicate with the inner hollow portion. When a cleaning gas G4 is supplied via the joint 76, e.g., a rotary joint, shown in FIG. 14, and through the hollow portions of the main shaft 72 and the scraping members 73, the cleaning gas G4 is blown against the inner wall of the combustion chamber 30 through the holes 73a. The cleaning gas G4 is also blown off from the upper ends of the scraping members 73. Thus, dust adhering to an area of a gap d between each scraping member 73 and the inner wall surface of the combustion chamber 30 can also be removed by blow-off.

Figure 22:
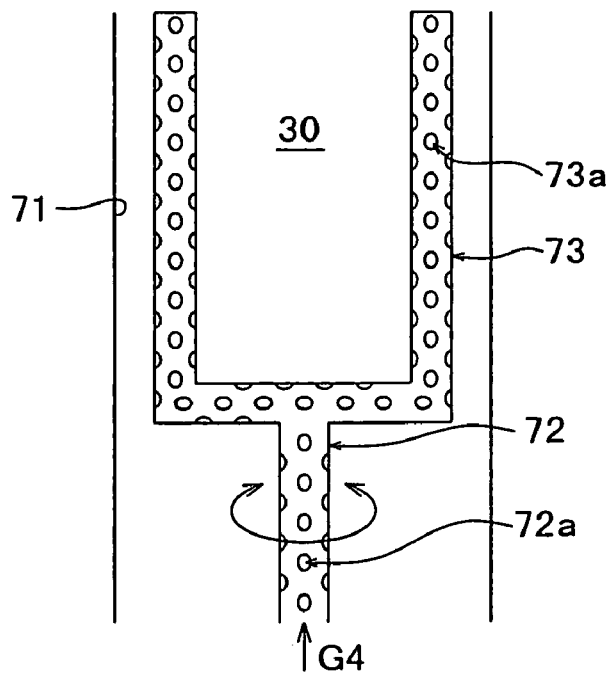
FIG. 22 is a diagram showing a structural example of a dust remover in piping according to the present invention.

FIG. 22 is a diagram showing another structural example of the scraping mechanism comprising the main shaft 72 and the scraping members 73. In this scraping mechanism, as illustrated in the figure, a multiplicity of small holes 73a and 72a are provided over the whole surface of each of the scraping members 73 and the main shaft 72 so as to communicate with the corresponding hollow portions. With this arrangement, dust can be removed by blow-off from the area of gap between each scraping member 73 and the inner wall surface of the combustion chamber 30 by introducing a cleaning gas G4 into the hollow portions of the main shaft 72 and the scraping members 73. In addition, dust attached to the main shaft 72 and the scraping members 73 themselves can be removed by blow-off.

Although in the embodiments shown in FIGS. 21 and 22 a multiplicity of holes 72a and 73a are provided in the surfaces of the main shaft 72 and the scraping members 73 so as to communicate with the hollow portions thereof, it should be noted that slits communicating with the hollow portions may be provided in place of the holes 72a and 73a. The arrangement of the scraping mechanism shown in FIGS. 15 and 16 is also applicable to the scraping mechanism comprising the main shaft 62 and the scraping members 63, which is shown in FIG. 19, as a matter of course.

Figure 23:
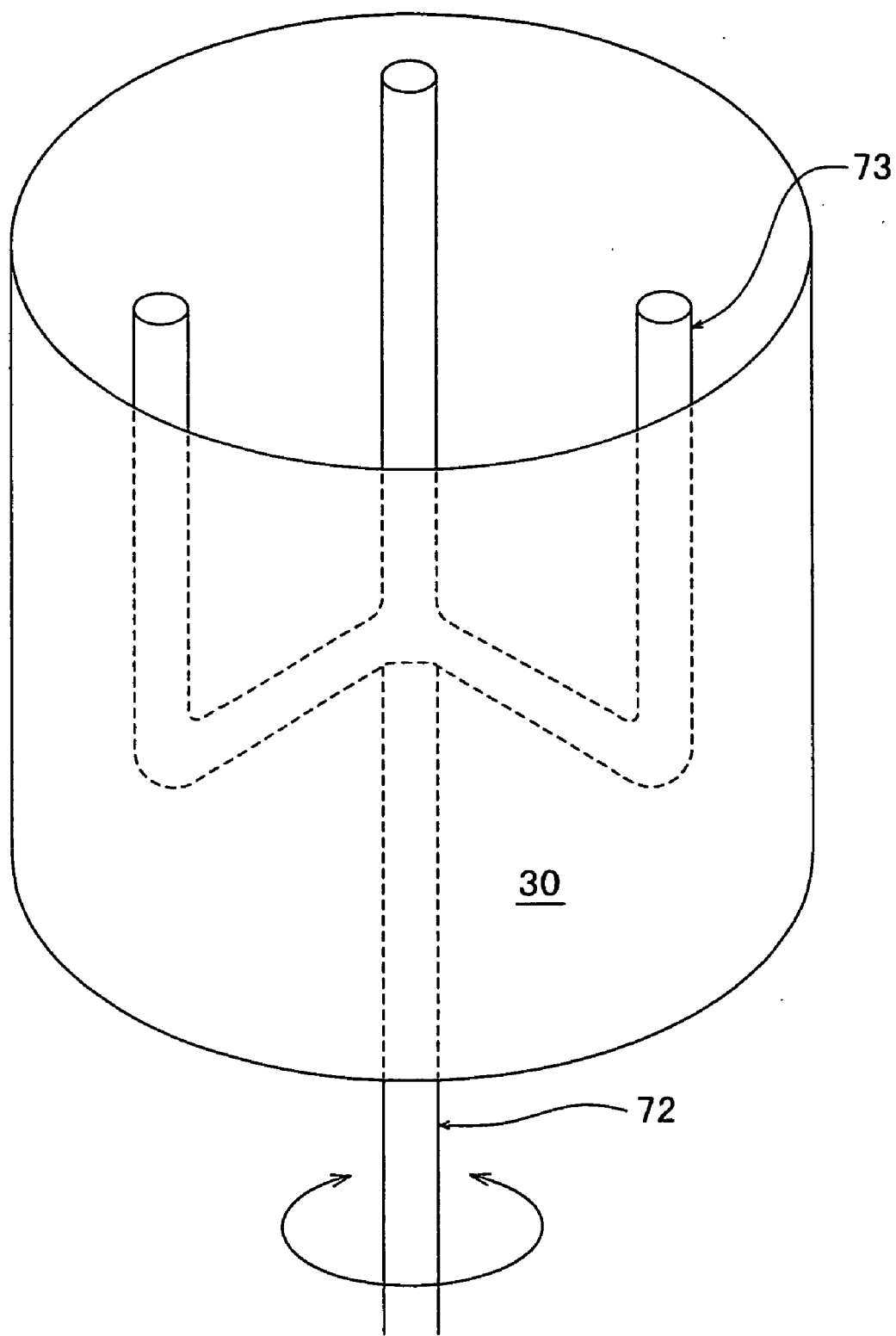
FIG. 23 is a diagram showing a structural example of a dust remover in piping according to the present invention.

Further, the number of scraping members 73 of the scraping mechanism is not necessarily limited to two. As shown in FIG. 23, three scraping members 73 may be provided on the main shaft 72. Further, the number of scraping members 73 may exceed three. Also in the case of FIG. 19, three or more scraping members may be provided on the main shaft 62 to constitute the scraping mechanism.

By increasing the number of scraping members 73 to three or more, the number of times of dust scraping per revolution of the scraping mechanism is increased. Thus, it is possible to cope with circumstances when the dust density is high. In a case where the scraping mechanism performs rotational reciprocating motion through a predetermined angle, dust in the whole area can be scraped off even if the oscillating angle of the scraping mechanism is reduced. However, if the number of scraping members 73 is increased extremely, dust adhering to the scraping mechanism itself may block the combustion chamber 30.

It should be noted that the scraping mechanisms as shown in FIGS. 20 to 23 may be installed in the waste gas treatment system shown in FIG. 1 to remove dust from the inner walls of the burner part 10 and the combustion chamber 30, although illustration of the arrangement is omitted.

In the dust removers arranged as shown in FIGS. 19 to 23, when the gas G1 or G3 flowing into the piping 61, the flame stabilizing part 10 and the combustion chamber 30 contains not only dust but also a component that may corrode the inner walls of the piping 61, the flame stabilizing part 10 and the combustion chamber 30 by a corrosive action or the like, a gas having the property of neutralizing the corrosive action is introduced into the cleaning gas G4 (for example, with respect to an acid gas flowing in, an alkaline gas, e.g., ammonia, is introduced). By doing so, the corrosion of the piping can be suppressed in an area covered with the cleaning gas G4.

Figure 24:
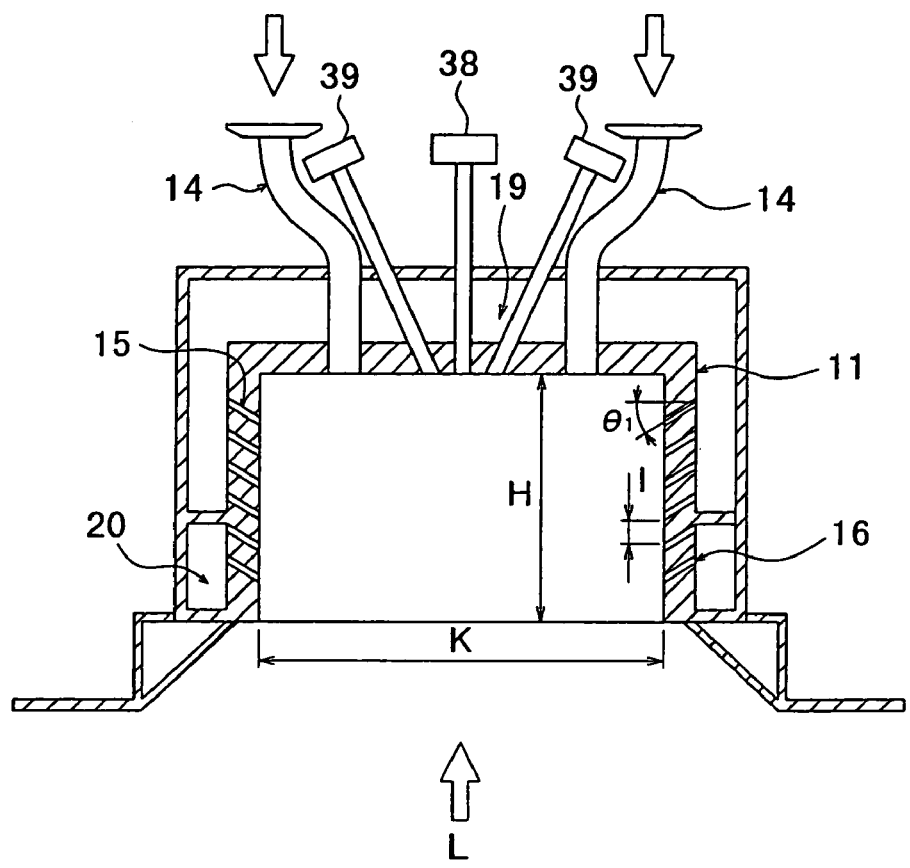
FIG. 24 is a diagram showing a structural example of a burner part in the waste gas treatment system according to the present invention.
Figure 25:
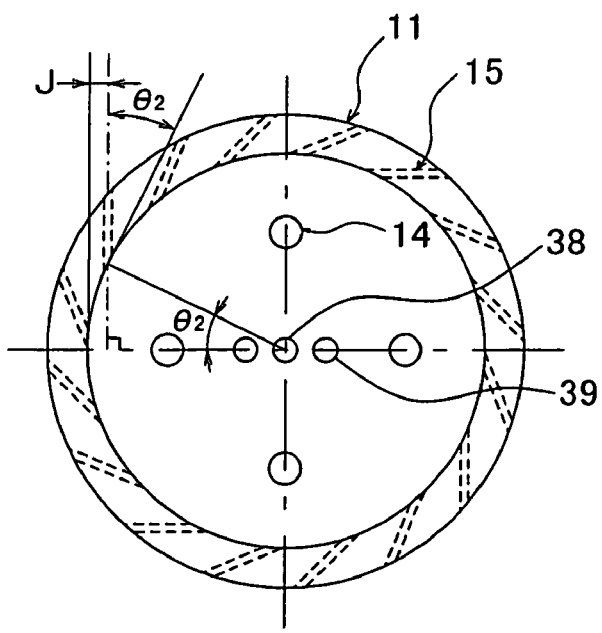
FIG. 25 is a diagram as seen in the direction of the arrow L in FIG. 24.

FIGS. 24 and 25 are diagrams showing another structural example of the burner part of the waste gas treatment system according to the present invention. FIG. 24 is a vertical sectional view, and FIG. 25 is a diagram as seen in the direction of the arrow L in FIG. 24. In the burner part 10, the height H of the flame stabilizing portion 18 is reduced and the spacing I between the air nozzles 15 and the auxiliary burning gas nozzles 16 is also reduced in comparison to the burner part 10 shown in FIGS. 3 and 4, by way of example. In other words, the air outlets of the air nozzles 15 are brought as close to the auxiliary burning gas outlets of the auxiliary burning gas nozzles 16 as possible. In addition, the spacing J between the center line of each air nozzle 15 and the tangent to the inner wall surface of the cylindrical member is reduced so that air blown off from the air nozzles 15 comes as close to the tangent to the inner wall surface of the cylindrical member 11 as possible.

By reducing the height H of the flame stabilizing portion 18 and reducing the spacing I between the air nozzles 15 and the auxiliary burning gas nozzles 16 as stated above, the stagnation of flow in the valley between the air outlets and the auxiliary burning gas outlets is eliminated, and dust attached or going to adhere to the inner wall surface of the frame stabilizing portion 18 is blown off by the air flow, thereby preventing adhesion of dust to the inner wall surface as much as possible.

Further, because the air blown off from the swirling nozzles 15 is close to the tangent to the inner wall surface of the cylindrical member 11, the stagnation of flow near the inner wall surface of the cylindrical member 111 is prevented, and it becomes unlikely that dust will adhere to the inner wall surface.

Furthermore, the air nozzles 15 are provided so that the flows of air blown from the air nozzles 15 are inclined toward the downstream side from the horizontal. When the angle θ of inclination of the air nozzles 15 with respect to a horizontal plane is set at about 30', the dust adhesion preventing effect is significant in the vicinities of the auxiliary burning gas nozzles 16. Further, a multiplicity of air nozzles 15 are provided so that the nozzle outlets are open equally in the circumferential direction of the inner wall surface of the cylindrical member 11, whereby the flows of air immediately after blow-off and at high flow velocity, which have high blow-off effect, are allowed to extend over the whole inner wall surface.

The horizontal air injection angle θ2 of the air nozzles 15 is set to θ2=360°/n, where n is the number of air nozzles 15 disposed in the circumferential direction, which is an integer of 3 or higher. Regarding the number n of air nozzles, when it was 4, 8, 12, 16 and 24, favorable results were obtained.

The ratio of the height H of the flame stabilizing portion 18 to the inner diameter K (H/K) is set at 15 mm/80 mm, whereas it has heretofore been 50 mm/80 mm. The spacing I between the lower air nozzle 15 and the upper auxiliary burning gas nozzle 16 is herein set at 16 mm, whereas it has heretofore been 26 mm. The spacing I is constant regardless of variations in the inner diameter K. The spacing J between the center line of each air nozzle 15 and the tangent to the inner wall surface, which is parallel to the center line, is herein set at 5 mm, whereas it has heretofore been 15 mm.

Figure 26:
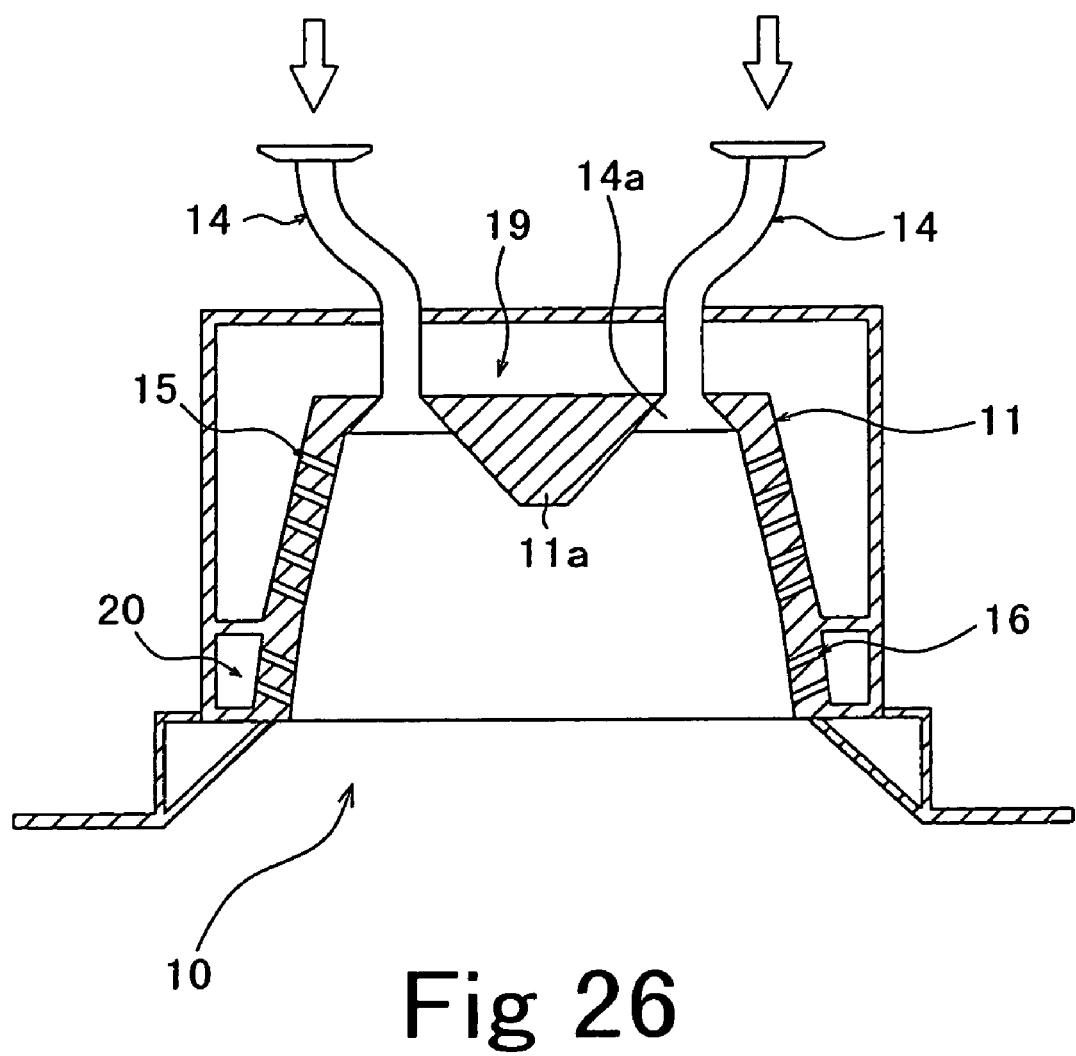
FIG. 26 is a diagram showing a structural example of a burner part in the waste gas treatment system according to the present invention.
Figure 27:
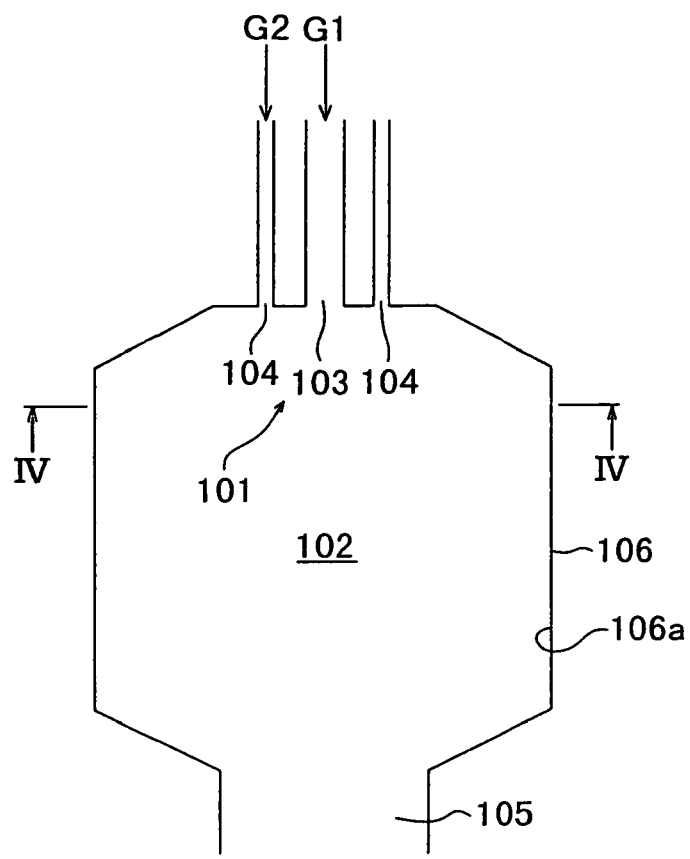
FIG. 27 is a diagram showing a structural example of a conventional waste gas treatment system.
Figure 28:
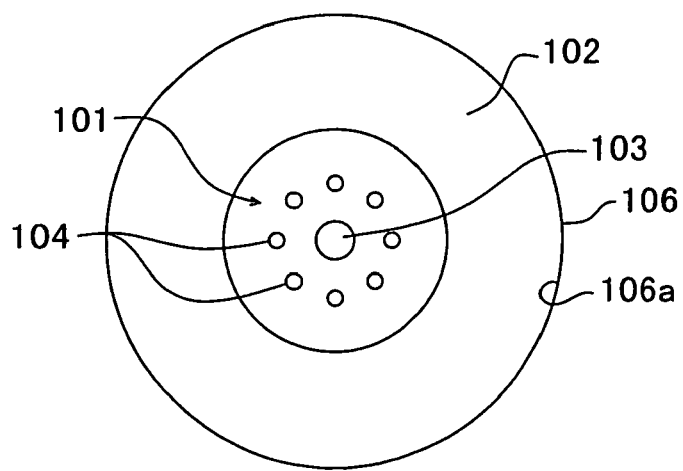
FIG. 28 is a sectional view as seen in the direction of the arrow IV—IV in FIG. 27.

FIG. 26 is a vertical sectional view showing another structural example of the burner part of the waste gas treatment system according to the present invention. In this burner part 10, as illustrated in the figure, the inner diameter of the opening 14a of each waste gas inlet pipe 14 gradually increases downwardly, and the inner diameter of the cylindrical member 11 also gradually increases downward. Thus, there is no angular portion such as a right-angled portion at the openings 14a of the waste gas inlet pipes 14 and inside the cylindrical member 11. In addition, an inverted frustoconical projection 11a may be provided between the openings 14a of the waste gas inlet pipes 14.

In general, dust in the burner part 10 is likely to adhere to angular portions and portions where air or waste gas stagnates. In this example, there is no angular portion such as a right-angled portion at the openings 14a of the waste gas inlet pipes 14 and inside the cylindrical member 11 as stated above. In addition, there is no area where waste gas may stagnate between the waste gas inlet pipes 14. Therefore, it becomes unlikely that dust will adhere to the inner wall surface.

INDUSTRIAL APPLICABILITY

As has been stated above, according to the invention, the combustion chamber is formed from an inner wall made of a fiber-reinforced ceramic material. Accordingly, the wear of the inner wall due to heat and corrosion is minimized, and thermal stress cracking is also reduced. Consequently, the lifetime of the system increases, and the cost of equipment and the availability factor can be improved. In addition, because the inner wall exhibits no catalytic effect, the formation of thermal NOx is suppressed, and it is possible to achieve environmental preservation and to simplify the treatment equipment. Accordingly, it is possible to provide a compact and low-cost waste gas treatment system as a whole.

In addition, according to the invention, the space between the inner wall and the outer vessel is maintained under a purge gas atmosphere of higher pressure than the pressure in the combustion chamber. Therefore, hazardous gases in the combustion chamber can be prevented from leaking to the outside.

In addition, according to the invention, a cooling means is provided to cool an auxiliary burning gas inlet part for introducing an auxiliary burning gas into the auxiliary burning gas nozzle in the burner part. Accordingly, even when the auxiliary burning gas inlet part is heated by flames, the rise in temperature is suppressed below the ignition point of the auxiliary burning gas. Therefore, there is no danger that the auxiliary burning gas may explode.

In addition, according to the invention, flames cannot come in direct contact with the cooling jacket. Therefore, the amount of heat of flames that is carried away by the cooling medium is reduced, and an increased amount of heat can be used for the waste gas treatment.

In addition, according to the invention, a dust removing means is provided to remove dust from the inner wall of the burner part and/or the inner wall of the combustion chamber or to prevent adhesion of dust thereto. Therefore, it is possible to operate the waste gas treatment system for a long period of time without blocking the burner part and/or the combustion chamber with dust.

In addition, according to the invention, dust attached to the inside of piping is removed by continuously or periodically oscillating or rotating a scraping mechanism installed in the piping. Consequently, the waste gas is allowed to flow through the piping with a minimal pressure loss.

In addition, according to the invention, the scraping member and the main shaft are formed from hollow pipes, respectively, and a cleaning gas is supplied from the outside of the piping through the hollow portions of the main shaft and the scraping member and blown off from the distal end of the scraping member or from a multiplicity of holes or slits in the surface thereof. Consequently, it is possible to remove dust from an area in the piping that cannot be reached by the scraping member. In addition, it becomes possible to remove dust attached to the scraping mechanism itself. In a case where a high-temperature gas flows through the piping, the durability of the system itself is improved by the cooling effect of the cleaning gas.

In addition, according to the invention, a neutralizing gas for neutralizing the gas flowing through the piping is used as a cleaning gas. Therefore, in a case where a high-temperature, corrosive gas flows through the piping, it is possible to expect not only the cooling effect but also the piping corrosion preventing effect.

In addition, according to the invention, the air nozzle is arranged to blow a swirling air flow downward against combustion flames formed downward below the opening. Accordingly, it is possible to provide a waste gas treatment system in which dust is likely to adhere to the inner wall of the nozzle part.

In addition, according to the invention, the inner diameter of the waste gas inlet and the inner diameter of the cylindrical member gradually increase toward the combustion chamber. Consequently, there is no angular portion such as a right-angled portion in the burner part. Accordingly, it is possible to provide a waste gas treatment system in which dust is unlikely to adhere to the inner wall of the nozzle part.

In addition, according to the invention, it is possible to provide a waste gas treatment system which is compact and capable of efficiently treating waste gases containing hazardous and combustible gases or scarcely decomposable gases.

What is claimed is:

1. A waste gas treatment system comprising:
   a burner part; and
   a combustion chamber provided at a downstream side of said burner part, wherein combustion flames are formed from said burner part toward said combustion chamber and a waste gas is introduced into the combustion flames, thereby oxidatively decomposing the waste gas,
   wherein said combustion chamber has an inner wall made of a fiber-reinforced ceramic material comprising ceramic cloth coated with a binder-containing ceramic material, and
   wherein said burner part has a cylindrical member having a side wall, being closed at a top thereof and having an opening at a bottom thereof, said cylindrical member also having a waste gas inlet in said top thereof and an air nozzle at a predetermined position on said side wall, said cylindrical member further having an auxiliary burning gas nozzle in said side wall in a vicinity of the opening, said air nozzle and said auxiliary burning gas nozzle extend at predetermined angles to a tangential direction to said cylindrical member to blow a swirling air flow and a swirling auxiliary burning gas flow downward against the combustion flames formed downward below the opening.

2. A waste gas treatment system according to claim 1, wherein said combustion chamber further comprises an outer wall and a thermal insulator made of a porous ceramic material located between said inner wall and said outer wall.

3. A waste gas treatment system according to claim 2, wherein said inner wall and said outer wall have a space therebetween, and said waste gas treatment system further comprises purge gas supply means to maintain the space under a purge gas atmosphere of higher pressure than a pressure in said combustion chamber.

4. A waste gas treatment system comprising:
   a burner part;
   a combustion chamber provided at a downstream side of said burner part, wherein combustion flames are formed from said burner part toward said combustion chamber, and a waste gas is introduced into the combustion flames, thereby oxidatively decomposing the waste gas;
   an auxiliary burning gas inlet part; and
   cooling means for cooling said auxiliary burning gas inlet part,
   wherein said burner part has a cylindrical member having a side wall, being closed at a top thereof and having an opening at a bottom thereof, said cylindrical member also having a waste gas inlet in said top thereof and an air nozzle at a predetermined position on said side wall thereof, said cylindrical member further having an auxiliary burning gas nozzle in said side wall in a vicinity of the opening, said auxiliary burning gas nozzle having an auxiliary burning gas introduced therein by said auxiliary burning gas inlet part,
   wherein the waste gas introduced from said waste gas inlet and air blown from said air nozzle are mixed together, and the auxiliary burning gas blown from said auxiliary burning gas nozzle is ignited to form combustion flames downward below the opening, and
   wherein said air nozzle and said auxiliary burning gas nozzle extend at predetermined angles to a tangential direction to said cylindrical member to blow a swirling air flow and a swirling auxiliary burning gas flow downward against the combustion flames formed downward below the opening.

5. A waste gas treatment system according to claim 4, wherein said auxiliary burning gas inlet part is an auxiliary burning gas chamber provided at an outer periphery of said cylindrical member, said auxiliary burning gas nozzle is provided in an inner side portion of said auxiliary burning gas chamber so as to blow the auxiliary burning gas toward a central portion of said combustion chamber, said waste gas treatment system further comprises a cooling jacket provided at a boundary between said auxiliary burning gas chamber and said combustion chamber, and said cooling means is arranged to cool said auxiliary burning gas chamber by supplying a cooling medium to said cooling jacket.

6. A waste gas treatment system according to claim 4, wherein said auxiliary burning gas inlet part is an auxiliary burning gas chamber provided at an outer periphery of said cylindrical member, said auxiliary burning gas nozzle is provided at a bottom of said auxiliary burning gas chamber so as to blow the auxiliary burning gas toward a central portion of said combustion chamber, said waste gas treatment system further comprises a cooling jacket provided either adjacent to said auxiliary burning gas chamber or at an outer periphery of said auxiliary burning gas chamber, and said cooling means is arranged to cool said auxiliary burning gas chamber by supplying a cooling medium to said cooling jacket.

7. A waste gas treatment system according to claim 4, wherein said auxiliary burning gas inlet part is an auxiliary burning gas inlet pipe having said auxiliary burning gas nozzle provided at a distal end thereof, said waste gas treatment system further comprises a cooling jacket provided at an outer periphery portion at a lower end of said cylindrical member, said auxiliary burning gas inlet pipe extends through said cooling jacket so that the auxiliary burning gas blows from said auxiliary burning gas nozzle toward a central portion of said combustion chamber, and said cooling means is arranged to cool said auxiliary burning gas inlet pipe by supplying a cooling medium to said cooling jacket.

8. A waste gas treatment system according to claim 4, wherein said auxiliary burning gas inlet part is an auxiliary burning gas inlet pipe having said auxiliary burning gas nozzle provided at a distal end thereof, said auxiliary burning gas inlet pipe being installed at an outer peripheral portion at a lower end of said cylindrical member so that the auxiliary burning gas blows from said auxiliary burning gas nozzle toward a central portion of said combustion chamber, said waste gas treatment system further comprises a cooling jacket provided at an outer periphery of said auxiliary burning gas inlet pipe, and said cooling means extends through said cooling jacket so as to cool said auxiliary burning gas inlet pipe by supplying a cooling medium to said cooling jacket.

9. A waste gas treatment system according to claim 4, wherein the cooling medium is one of water, air, other liquids and other gases.

10. A waste gas treatment system comprising:
a burner part;
a combustion chamber provided at a downstream side of said burner part, wherein combustion flames are formed from said burner part toward said combustion chamber, and a waste gas is introduced into the combustion flames, thereby oxidatively decomposing the waste gas; and
a dust remover provided to remove dust from at least one of an inner wall of said burner part and an inner wall of said combustion chamber or to prevent adhesion of dust thereto,
wherein said burner part has a cylindrical member having said inner wall, being closed at a top thereof and having an opening at a bottom thereof, said cylindrical member having a waste gas inlet in said top thereof for introducing the waste gas into the combustion flames, and
wherein said dust remover comprises a dust scraping plate secured to a shaft so as to be moved vertically during operation in said at least one of said burner part and said combustion chamber, said dust scraping plate having a hole which corresponds to and is larger than an opening of said waste gas inlet.

11. A waste gas treatment system according to claim 10, wherein said dust remover further comprises an air injection nozzle operable to form a layer of air stream along at least one of an inner wall surface of said burner part and an inner wall surface of said combustion chamber so that the layer of air stream prevents dust from adhering to said at least one of said inner wall surface of said burner part and said inner wall surface of said combustion chamber.

12. A method of operating the waste gas treatment system according to claim 11, said method comprising introducing the waste gas into the combustion flames through said hole of said dust scraping plate, and forming the layer of air stream along said at least one of said inner wall surface of said burner part and said inner wall surface of said combustion chamber with said air injection nozzle, said forming of the layer of air stream comprising continuously or intermittently injecting air from said air injection nozzle.

13. A waste gas treatment system comprising:
a burner part; and
a combustion chamber provided at a downstream side of said burner part, wherein combustion flames are formed from said burner part toward said combustion chamber, and a waste gas is introduced into the combustion flames, thereby oxidatively decomposing the waste gas, and wherein
said burner part has a cylindrical member having a side wall, being closed at a top thereof and having an opening at a bottom thereof, said cylindrical member also having a waste gas inlet in said top thereof and an air nozzle at a predetermined position on said side wall thereof, said cylindrical member further having an auxiliary burning gas nozzle in said side wall in a vicinity of the opening, said air nozzle and said auxiliary burning gas nozzle extend at predetermined angles to a tangential direction to said cylindrical member to blow a swirling air flow and a swirling auxiliary burning gas flow downward against the combustion flames formed downward below the opening as a result of ignition of an auxiliary burning gas injected from said auxiliary burning gas nozzle.

14. A waste gas treatment system according to claim 13, wherein said air nozzle is provided such that a center line of said air nozzle is close to a tangent to an inner wall surface of said cylindrical member that is parallel to the center line so that air will not stagnate at said inner wall surface.

15. A waste gas treatment system according to claim 13, wherein said air nozzle and said auxiliary burning gas nozzle are provided close to each other so that dust present between said air nozzle and said auxiliary burning gas nozzle can be blown away with air blown from said air nozzle.

16. A waste gas treatment system according to claim 14, wherein said air nozzle and said auxiliary burning gas nozzle are provided close to each other so that dust present between said air nozzle and said auxiliary burning gas nozzle can be blown away with air blown from said air nozzle.

17. A waste gas treatment system comprising:
a burner part; and
a combustion chamber provided at a downstream side of said burner part, wherein combustion flames are formed from said burner part toward said combustion chamber, and a waste gas is introduced into the combustion flames, thereby oxidatively decomposing the waste gas,
wherein said burner part has a cylindrical member having a side wall, being closed at a top thereof and having an opening at a bottom thereof, said cylindrical member also having a waste gas inlet in said top thereof and an air nozzle at a predetermined position on said side wall thereof, said cylindrical member further having an auxiliary burning gas nozzle in said side wall in a vicinity of the opening, wherein at least one of an inner diameter of said waste gas inlet and an inner diameter of said cylindrical member gradually increases toward said combustion chamber, and
wherein said air nozzle and said auxiliary burning gas nozzle extend at predetermined angles to a tangential direction to said cylindrical member to blow a swirling air flow and a swirling auxiliary burning gas flow downward against the combustion flames formed downward below the opening.

* * * * *